United States Patent
Nitta et al.

(10) Patent No.: US 8,144,751 B2
(45) Date of Patent: Mar. 27, 2012

(54) SATELLITE SIGNAL RECEIVER APPARATUS AND SATELLITE SIGNAL RECEPTION METHOD

(75) Inventors: Manabu Nitta, Kanagawa (JP); Hideki Awata, Gunma (JP); Hideki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1421 days.

(21) Appl. No.: 11/584,962

(22) Filed: Oct. 23, 2006

(65) Prior Publication Data

US 2007/0160117 A1 Jul. 12, 2007

(30) Foreign Application Priority Data

Oct. 24, 2005 (JP) ................................ P2005-308133

(51) Int. Cl.
*H04B 1/69* (2011.01)

(52) U.S. Cl. ......... 375/150; 375/152; 375/220; 375/340

(58) Field of Classification Search .................. 375/130, 375/133, 134, 150; 342/357.12, 357.06
See application file for complete search history.

(56) References Cited

U.S. PATENT DOCUMENTS

| | | | | |
|---|---|---|---|---|
| 4,559,633 A | * | 12/1985 | Kan et al. ...................... | 375/145 |
| 5,101,416 A | * | 3/1992 | Fenton et al. .................. | 375/150 |
| 5,329,549 A | * | 7/1994 | Kawasaki ...................... | 375/150 |
| 5,499,267 A | * | 3/1996 | Ohe et al. ...................... | 375/141 |
| 5,793,328 A | * | 8/1998 | Ward et al. ............... | 342/357.09 |
| 5,914,943 A | * | 6/1999 | Higuchi et al. ............... | 370/320 |
| 6,151,353 A | * | 11/2000 | Harrison et al. ............. | 375/136 |
| 6,181,731 B1 | * | 1/2001 | Kochi et al. .................... | 375/144 |
| 6,182,011 B1 | * | 1/2001 | Ward .............................. | 701/213 |
| 6,492,586 B2 | * | 12/2002 | Mikami et al. ............... | 136/244 |
| 7,209,514 B2 | * | 4/2007 | Tanaka et al. ................. | 375/150 |
| 7,280,586 B2 | * | 10/2007 | Tanaka .......................... | 375/150 |
| 2003/0231704 A1 | | 12/2003 | Tanaka et al. | |
| 2004/0013175 A1 | * | 1/2004 | Tanaka .......................... | 375/149 |

FOREIGN PATENT DOCUMENTS

| | | |
|---|---|---|
| JP | 5 256927 | 10/1993 |
| JP | 2001 42022 | 2/2001 |
| JP | 2002 118498 | 4/2002 |
| JP | 2004 340855 | 12/2004 |
| JP | 2005 55375 | 3/2005 |
| JP | 2005 117265 | 4/2005 |
| JP | 2005 164333 | 6/2005 |

* cited by examiner

*Primary Examiner* — Khanh C Tran
*Assistant Examiner* — Qutbuddin Ghulamali
(74) *Attorney, Agent, or Firm* — Frommer Lawrence & Haug LLP; William S. Frommer

(57) ABSTRACT

A satellite signal receiver apparatus by which the hardware scale can be suppressed while high speed synchronization is assured. A carrier frequency component is removed from a satellite signal. Then, adding those of signals obtained after every period interval of spread spectrum codes and signals stored in a memory which have a same phase at the period intervals and writing an addition result back into the memory are repeated by a number of times corresponding to plural periods thereby to accumulate signals corresponding to sums of the signals added over the plural periods at the period intervals into the memory. Then, correlation calculation is performed between the signals for the one period of the spread spectrum codes corresponding to the plural periods and a spread spectrum code of the receiver side to detect a correlation point between the satellite signal and the receiver side spread spectrum code.

14 Claims, 25 Drawing Sheets

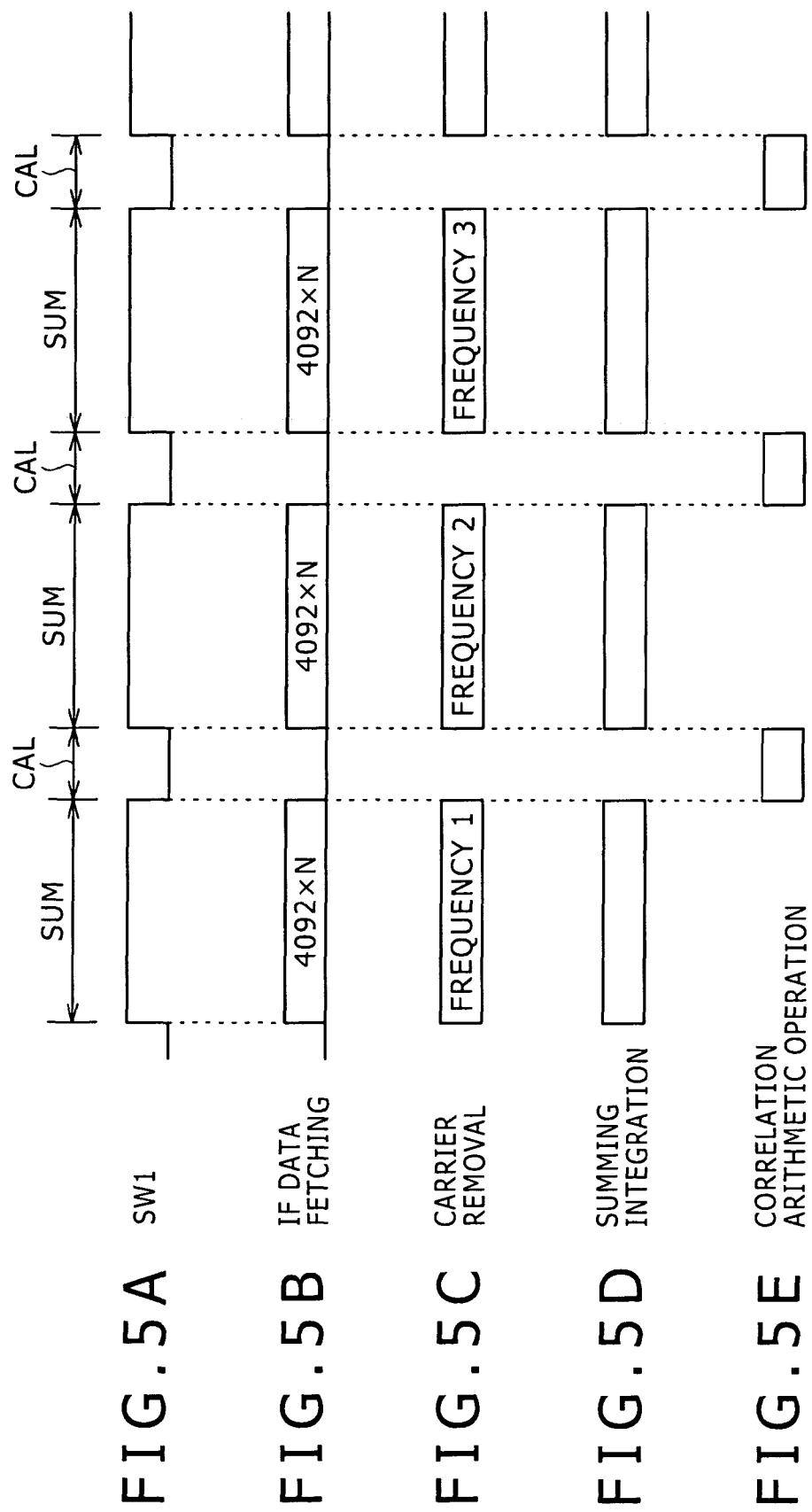

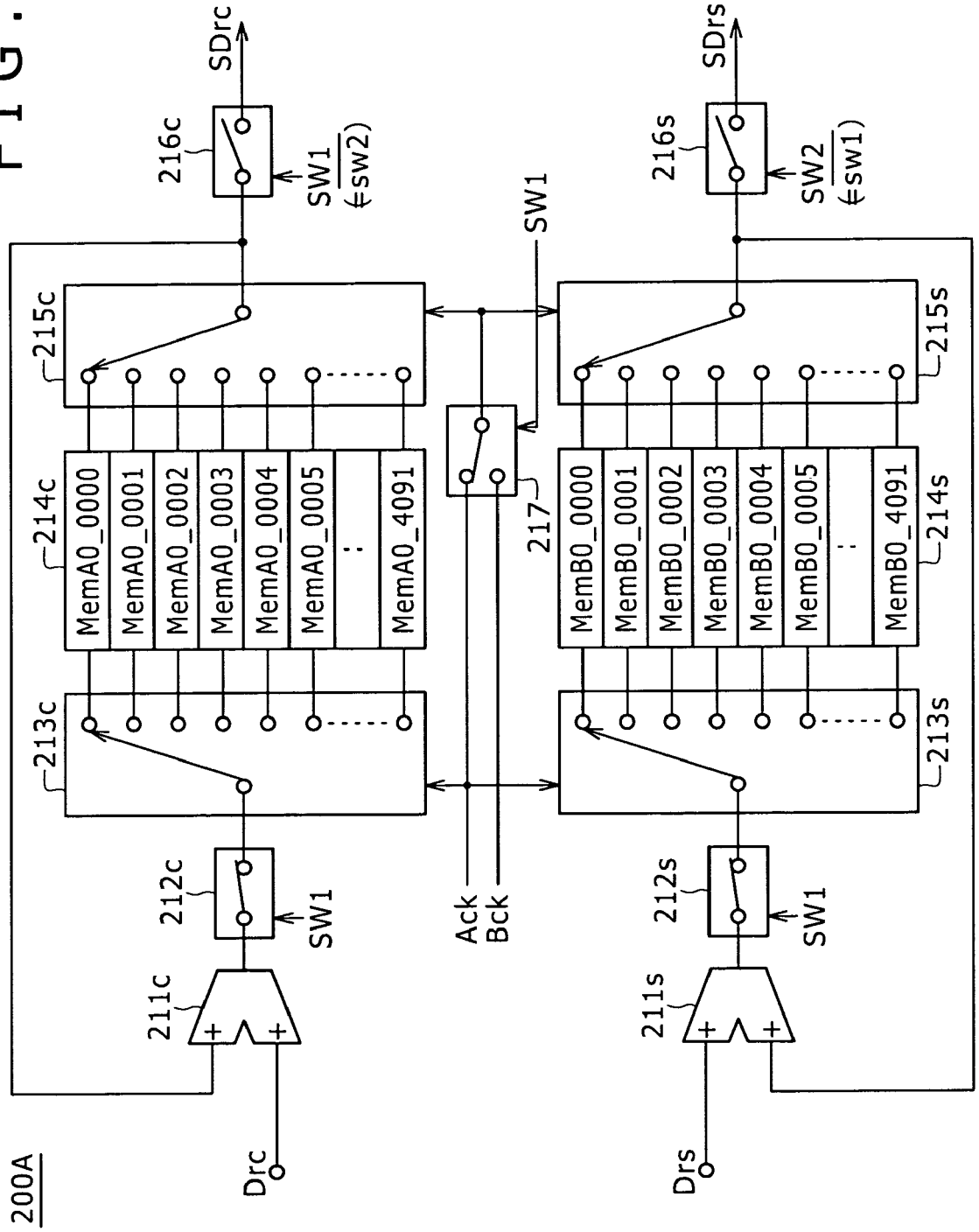

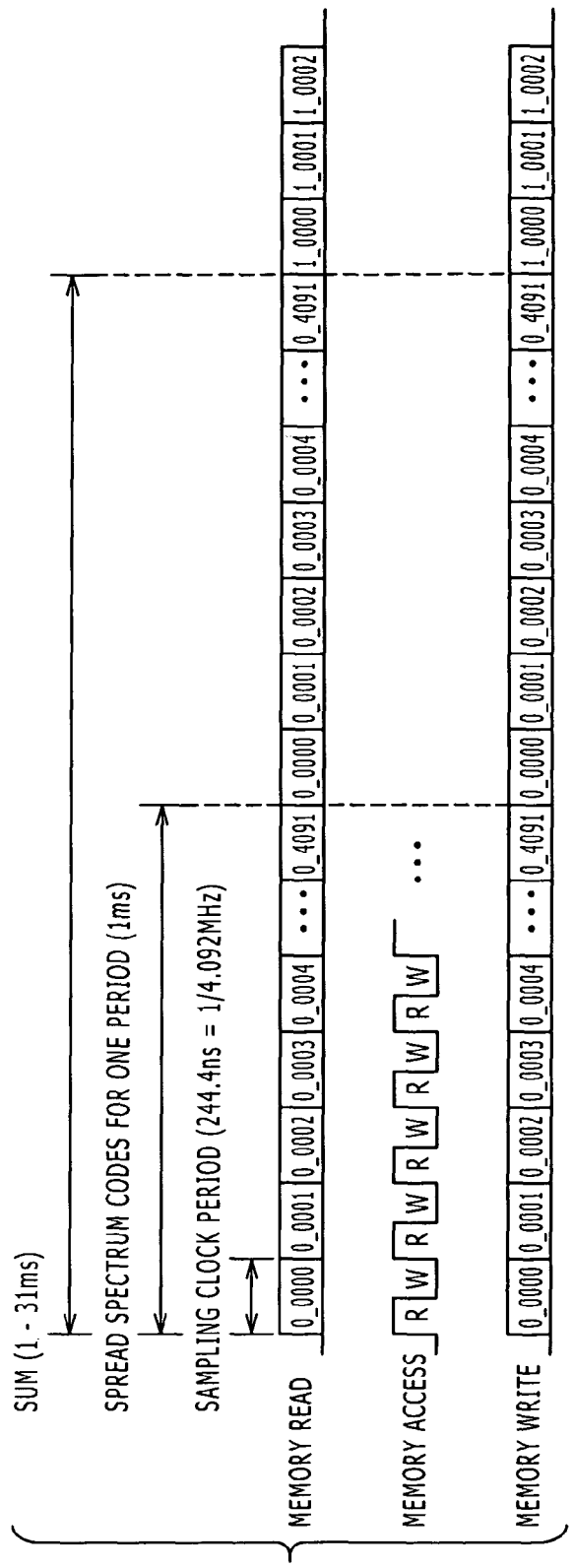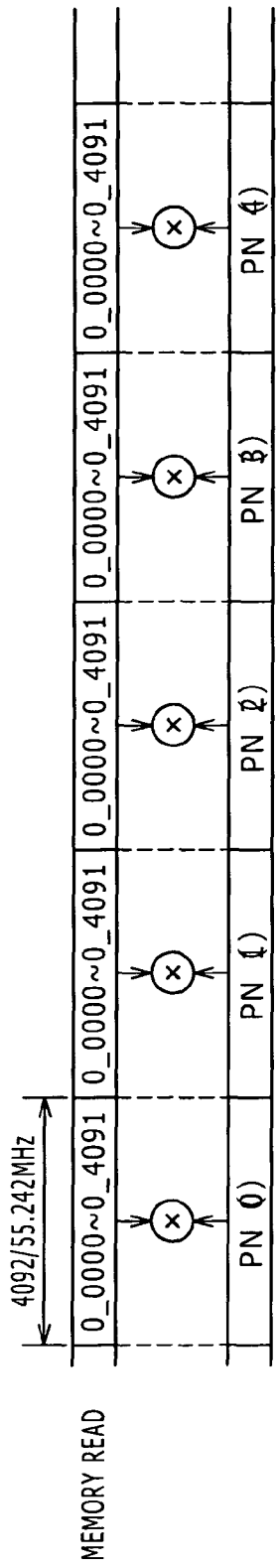

SATELLITE SIGNAL RECEIVER APPARATUS AND SATELLITE SIGNAL RECEPTION METHOD

CROSS REFERENCES TO RELATED APPLICATIONS

The present invention contains subject matter related to Japanese Patent Application JP 2005-308133 filed in the Japanese Patent Office on Oct. 24, 2005, the entire contents of which being incorporated herein by reference.

BACKGROUND OF THE INVENTION

1. Field of the Invention

This invention relates to a satellite signal receiver apparatus and a satellite signal reception method wherein a plurality of signal waves from different artificial satellites in a global navigation satellites system (GNSS) such as, for example, the global positioning system (GPS) are received to calculate the position or the speed of the receiver apparatus itself.

2. Description of the Related Art

In a GNSS system wherein artificial satellites (hereinafter referred to simply as satellites) are utilized to measure the position of a moving body such as, for example, the GPS system, a GPS receiver is used as a satellite signal receiver apparatus. The GPS receiver has basic functions of receiving signals from four or more satellites, calculating the position of the receiver itself from the received signals and notifying a user of the position.

In the GPS system, signals from satellites are in a form spectrum spread by a spread spectrum code called C/A (Clear and Acquisition) code in the L1 band. The C/A code is a spread spectrum code which is formed from a code, for example, a Gold code, of a PN (pseudo random noise) series whose transmission signal rate (chip rate) is 1.023 MHz and whose code length is 1,023. Codes of the PN series of the C/A code differ among different satellites.

A signal from a satellite (such signal is hereinafter referred to as satellite signal) is obtained by BPSK (Binary Phase Shift Keying) modulation of a carrier whose frequency is 1,575.42 MHz with a signal obtained by spectrum spreading of data of 50 bps using the spread spectrum code.

Japanese Patent Laid-Open No. 2003-258769 discloses a GPS receiver and a receiving method for GPS satellite signals. The GPS receiver receives and demodulates such satellite signals as described above to acquire navigation data including orbit information and time information of satellites called almanac or ephemeris. The GPS receiver stores and retains the orbit information and so forth into and in a memory.

Then, the GPS receiver derives the three-dimensional position of the GPS receiver itself using simultaneous equations from the orbit information and the time information of the satellites and delay times of the signals received from the satellites. The delay times are differences between arriving time points of the received signals and the sending time points from the satellites. The reason why four signals from different satellites are required for position measurement is that, since an error exists between the time in the GPS receiver and the time in each satellite, any influence of such errors should be eliminated.

Incidentally, since a signal received from a satellite is such a BPSK modulation signal as described above, in order for a GPS receiver to receive a signal from a satellite, it is necessary to establish synchronism among a spread spectrum code, a carrier and data. In other words, synchronization is required. However, synchronization of a spread spectrum code and synchronization of a carrier cannot be performed independently of each other.

Further, a GPS receiver normally converts the carrier frequency into a frequency within several MHz so that it may perform processing using an intermediate frequency (hereinafter referred to simply as IF). A carrier of an IF includes a Doppler shift caused principally by the moving speed of the satellite and a frequency error of a local oscillator which is generated in the GPS receiver and used in frequency conversion into an IF. Due to the Doppler shift and the frequency error, the carrier frequency of the IF is unknown. Meanwhile, a synchronous point of a spread spectrum code relies upon the positional relationship between the GPS receiver and the satellite, and therefore, also the synchronous point is unknown.

If much time is taken for the synchronization of the spread spectrum code and the carrier, then the reaction of the GPS receiver is retarded, resulting in disadvantage in use.

The GPS receiver in related art uses a frequency search regarding a carrier and a spread spectrum code synchronization technique which is based on a sliding correlator+DLL (Delay Locked Loop)+Costas loop.

However, the synchronization method based on a sliding correlator+DLL+Costas loop described above is not suitable for high speed synchronism in principle. In order to make up for this, an actual receiver uses multiple channels to parallelly search for a synchronous point. Therefore, the synchronization method has a drawback that a great hardware scale is required.

In recent years, thanks to enhancement of the hardware capacity, it has become possible to perform code synchronization of a spectrum spread spectrum code at a high speed using a digital matched filter. FIG. 25 shows an example of a configuration of an apparatus which performs synchronization of a spread spectrum code by means of a digital matched filter which uses a transversal filter.

Referring to FIG. 25, the digital matched filter shown includes a shift register 1 including a number of stages equal to the number N−1 of chips of a spread spectrum code. The shift register 1 successively receives a digital signal Din received from a satellite after converted into a signal of an IF in response to a clock CLK in a unit of a data sample of the digital signal Din.

Then, the digital signal Din and outputs of registers $RG_1$, $RG_2$, $RG_3$, ..., $RGN_{N-1}$ at the stages of the shift register 1 are supplied to multipliers $2_1$, $2_2$, $2_3$, ..., $2_N$, respectively.

Each of the multipliers $2_1$, $2_2$, $2_3$, ..., $2_N$ is supplied with a value (+1 or −1) of a chip of a spread spectrum code from a spread signal generation section 3. In this instance, the values of the chips of the spread spectrum code are supplied in a reverse order to the multipliers $2_1$, $2_2$, $2_3$, ..., $2_N$ in such a manner that the first chip of the spread spectrum code from the spread signal generation section 3 is supplied to the multiplier $2_N$ and the Nth chip is supplied to the multiplier $2_1$.

After the two inputs are multiplied by each of the multipliers $2_1$, $2_2$, $2_3$, ..., $2_N$, results of the multiplication are supplied to a summing section 4, by which summing arithmetic operation is performed. A result of the summing arithmetic operation from the summing section 4 is attenuated to 1/N by a level adjustment section 5 and outputted as correlation result CRout from the level adjustment section 5.

Accordingly, at a chip phase at which the digital signal Din synchronized with the spread spectrum code from the spread signal generation section 3 is fetched into the shift register 1, the correlation result CRout from the summing section 4 exhibits a peak, but at any other chip phase, the correlation result CRout exhibits a lower level. In other words, a signal having such a characteristic as illustrated in FIG. 26 is obtained as the correlation result CRout from the summing section 4.

SUMMARY OF THE INVENTION

However, in the synchronization method in related art described above, also where such a digital matched filter as described above is used, a received signal from a satellite is processed as it is on the real time basis. Therefore, the arithmetic operation amount as a whole is very great, and this results in a large hardware scale.

In particular, at least register transfer, multiplication and sum total calculation of sample data for a period of time corresponding to the number of chips of a spread spectrum code should be performed within a unit processing time period. For example, in the configuration shown in FIG. 25, the unit processing time period is a one-sample time period of the data Din of the received signal.

However, if the basic hardware configuration of FIG. 25 cannot process sufficiently from the restrictions to the processing speed of hardware components and the processing clock frequency, then effective processing time is increased by processing a plurality of sample data concurrently or by like means. Therefore, it is necessary for the hardware configuration to include a plurality of such hardware configurations as shown in FIG. 25. Consequently, a hardware configuration of an increased scale is required.

That the hardware scale increases significantly in this manner gives rise to a disadvantage that, for example, where the hardware configuration is integrated into an IC (Integrated Circuit), the IC chip has a great size and requires a high cost.

Therefore, it is demanded to provide a satellite signal receiver apparatus and a satellite signal reception method by which the hardware scale can be suppressed while high speed synchronization is assured.

According to an embodiment of the present invention, there is provided a satellite signal receiver apparatus for receiving a signal spectrum spread with spread spectrum codes from an artificial satellite and detecting a correlation point between the spread spectrum codes and a spread spectrum code prepared on the receiver side to perform synchronization regarding the signal from the artificial satellite, including a carrier removal section configured to remove a carrier frequency component from the signal from the artificial satellite, a data addition section including a memory for one period of the spread spectrum codes and an addition section and configured to repeat adding those of signals obtained after every period interval of the spread spectrum codes from the signal after the carrier frequency component is removed and signals stored in the memory which have a same phase at the period intervals of the spread spectrum codes using the addition section and writing a result of the addition back into the memory by a number of times corresponding to a plurality of periods of the spread spectrum codes thereby to accumulate signals corresponding to sums of the signals, from which the carrier signal component is removed, added over the plural periods of the spread spectrum codes at the period intervals of the spread spectrum codes into the memory, and a method to calculate synchronous phase configured to perform correlation calculation between the signals for the one period of the spread spectrum codes accumulated in the memory of the data addition section and corresponding to the plural periods of the spread spectrum codes and the spread spectrum code of the receiver side to detect a correlation point between the signal from the artificial satellite and the spread spectrum code of the receiver side.

In the satellite signal receiver apparatus, a carrier frequency component is removed from a signal received from an artificial satellite by the carrier removal section. Then, signals having a same phase at period intervals of spread spectrum codes of the received signal are added and accumulated for a plurality of periods of the spread spectrum codes.

Then, the method to calculate synchronous phase performs correlation calculation of the signals which are sum signals for the plural periods of the spread spectrum codes, that is, signals for one period of the spread spectrum codes, with the spread spectrum code of the receiver side to detect a correlation point between the signal from the artificial satellite and the spread spectrum code of the receiver side.

Accordingly, with the satellite signal receiver apparatus, correlation arithmetic operation of a signal received from an artificial satellite with a spread spectrum code of the receiver side is not performed with regard to period intervals of all spread spectrum codes. Therefore, the arithmetic operation amount is reduced as a whole, and the hardware scale can be reduced as much.

In summary, with the satellite signal receiver apparatus, the arithmetic operation amount as a whole can be reduced and the hardware scale can be reduced. Accordingly, where an integration circuit technique is applied to the satellite signal receiver apparatus, the chip size can be reduced and the production cost can be reduced. Consequently, the IC can be reduced at a low cost.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 5A to 5E are timing charts illustrating operation of the IF carrier removal section and the data addition processing section of FIG. 3;

FIG. 6 is a block diagram showing a first example of a configuration of the data addition processing section shown in FIG. 3;

FIGS. 7A and 7B are timing charts illustrating operation of the data addition processing section of FIG. 6;

DETAILED DESCRIPTION OF THE PREFERRED EMBODIMENTS

[General Configuration of a Satellite Signal Receiver Apparatus of an Embodiment]

Figure 2:
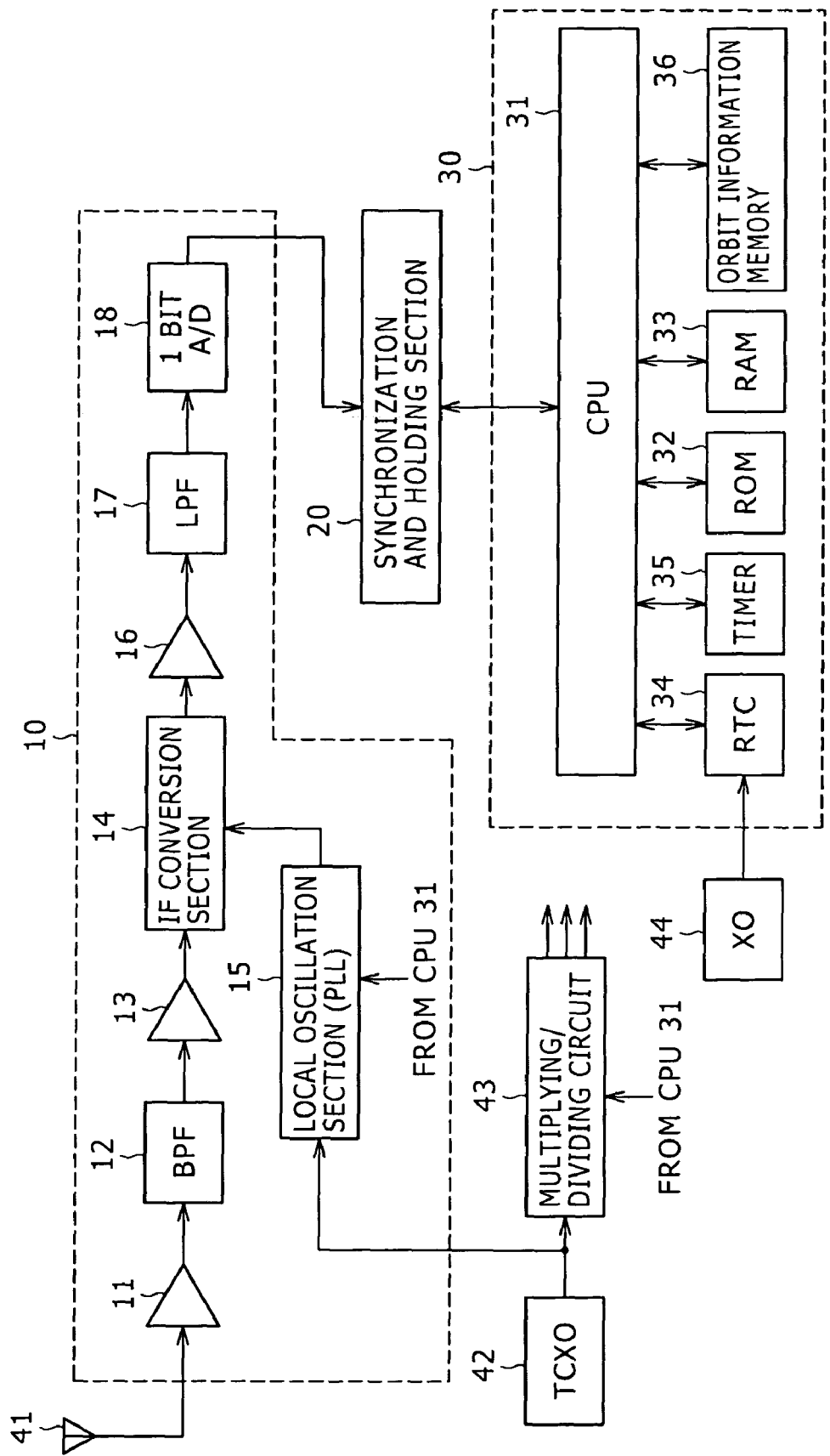
FIG. 2 is a block diagram showing an example of a configuration of a satellite signal receiver apparatus according to a first embodiment of the present invention.

FIG. 2 shows an example of a configuration of a satellite signal receiver apparatus to which the present invention is applied. Referring to FIG. 2, the satellite signal receiver apparatus shown includes a frequency conversion section 10, a synchronization and holding section 20, a control section 30, and a GPS antenna 41. The satellite signal receiver apparatus further includes a reference oscillation circuit (TCXO) 42 formed from a quartz oscillation circuit with temperature compensation, a multiplying/dividing circuit 43 as a timing signal generation circuit and a quartz oscillation circuit (XO) 44.

The control section 30 includes a CPU (Central Processing Unit) 31, a program ROM (Read Only Memory) 32, a RAM (Random Access Memory) 33 for a working area, a clock circuit 34 for measuring a real time clock (RTC), a timer 35, and an orbit information memory 36. The program ROM 32, RAM 33, clock circuit 34, timer 35 and orbit information memory 36 are connected to the CPU 31.

The timer 35 is used for generation of various timings necessary for action of the components of the control section 30 and for the reference to time thereof. The orbit information memory 36 is formed from a nonvolatile memory and stores orbit information including almanac information and ephemeris information read out from GPS satellite signals. The ephemeris information in the orbit-information memory 36 is updated, for example, after every two hours, and the almanac information is updated, for example, after every several days to several months.

A reference clock signal from the reference oscillation circuit 42 is supplied to the multiplying/dividing circuit 43 and also to a local oscillation circuit (PLL) 15 for frequency conversion of the frequency conversion section 10 as hereinafter described. The multiplying/dividing circuit 43 multiplies or divides the reference clock signal to produce clock signals to be supplied to the synchronization and holding section 20, control section 30 and so forth. The multiplication and division ratios of the multiplying/dividing circuit 43 are controlled by the CPU 31 of the control section 30.

It is to be noted that the clock signal from the reference oscillation circuit 42 is used for the quartz oscillation circuit 44 of the control section 30, and the clock signals for the components other than the quartz oscillation circuit 44 of the control section 30 are obtained as the clock signals from the multiplying/dividing circuit 43.

[Configuration of the Frequency Conversion Section 10]

GPS satellite signals are transmitted from different GPS satellites as described hereinabove. A GPS satellite signal is obtained by BPSK modulation of a carrier whose frequency is 1,575.42 MHz with a signal (C/A) code obtained by spectrum spreading transmission data of 50 bps with PN codes (spread spectrum codes) determined for each GPS satellite and having a transmission signal rate of 1.023 MHz and a code length of 1,023.

Each of the GPS satellite signals of 1,575.42 MHz received by the GPS antenna 41 is supplied to the frequency conversion section 10. In the frequency conversion section 10, the GPS satellite signal received by the GPS antenna 41 is amplified by a low-noise amplification circuit 11 and then supplied to a band pass filter 12, by which unnecessary frequency components are removed from the GPS satellite signal. A signal from the band pass filter 12 is supplied to an intermediate frequency conversion circuit 14 through a high frequency amplification circuit 13.

An output of the reference oscillation circuit 42 is supplied to the local oscillation circuit 15 which is of the PLL (Phase Locked Loop) synthesizer type, and a local oscillation output whose frequency ratio to the output frequency of the reference oscillation circuit 42 is fixed is obtained from the local oscillation circuit 15. The local oscillation output is supplied to the intermediate frequency conversion circuit 14, by which the GPS satellite signal is converted into an intermediate frequency signal of an intermediate frequency whose signal processing is easy, such as, for example, a frequency of 1.023 MHz.

The intermediate frequency signal from the intermediate frequency conversion circuit 14 is amplified by an amplification circuit 16 and then band-limited by a low-pass filter 17, whereafter it is converted into a digital signal (hereinafter referred to as IF data) of one bit by an A/D (analog to digital) converter 18. The IF data is supplied to the synchronization and holding section 20.

In the present embodiment, the synchronization and holding section 20 performs synchronization of GPS satellite signals. In particular, the synchronization and holding section 20 performs phase detection of spread spectrum codes of GPS satellite signals and detection of a frequency (hereinafter referred to as IF carrier frequency) of intermediate frequency signals. Further, the synchronization and holding section 20 performs synchronism holding of spread spectrum codes and IF carriers of the acquired GPS satellite signals.

The synchronization and holding section 20 may be configured as an integrated circuit for synchronization and synchronism holding or may be configured from a synchronization section and a synchronism holding section functionally separated from each other as disclosed, for example, in Japanese Patent Laid-Open No. 2003-258769 mentioned hereinabove.

[Configuration of the Synchronization and Holding Section 20]

In the present embodiment, the synchronization section and the synchronism holding section are formed functionally separately from each other as in the apparatus disclosed in Japanese Patent Laid-Open No. 2003-258769. In the embodiment described below, the present invention is applied to the synchronization section of the synchronization and holding section 20, and the synchronization section in the present embodiment supplies a synchronization phase output of a spread spectrum code and a correlation value as a result of processing thereof to the control section 30. When the control section 30 receives the synchronization phase output and the correlation value of the spread spectrum code from the synchronization section of the synchronization and holding section 20, it passes the synchronization phase output as an initial phase for a spread spectrum code generator of the synchronism holding section of the synchronization and holding section 20 so that the synchronism holding section executes synchronism holding of the spread spectrum code. The synchronism holding section of the synchronization and holding section 20 further performs synchronism holding of the IF carrier.

<General Configuration of the Synchronization Section of the Synchronization and Holding Section 20>

Figure 1:
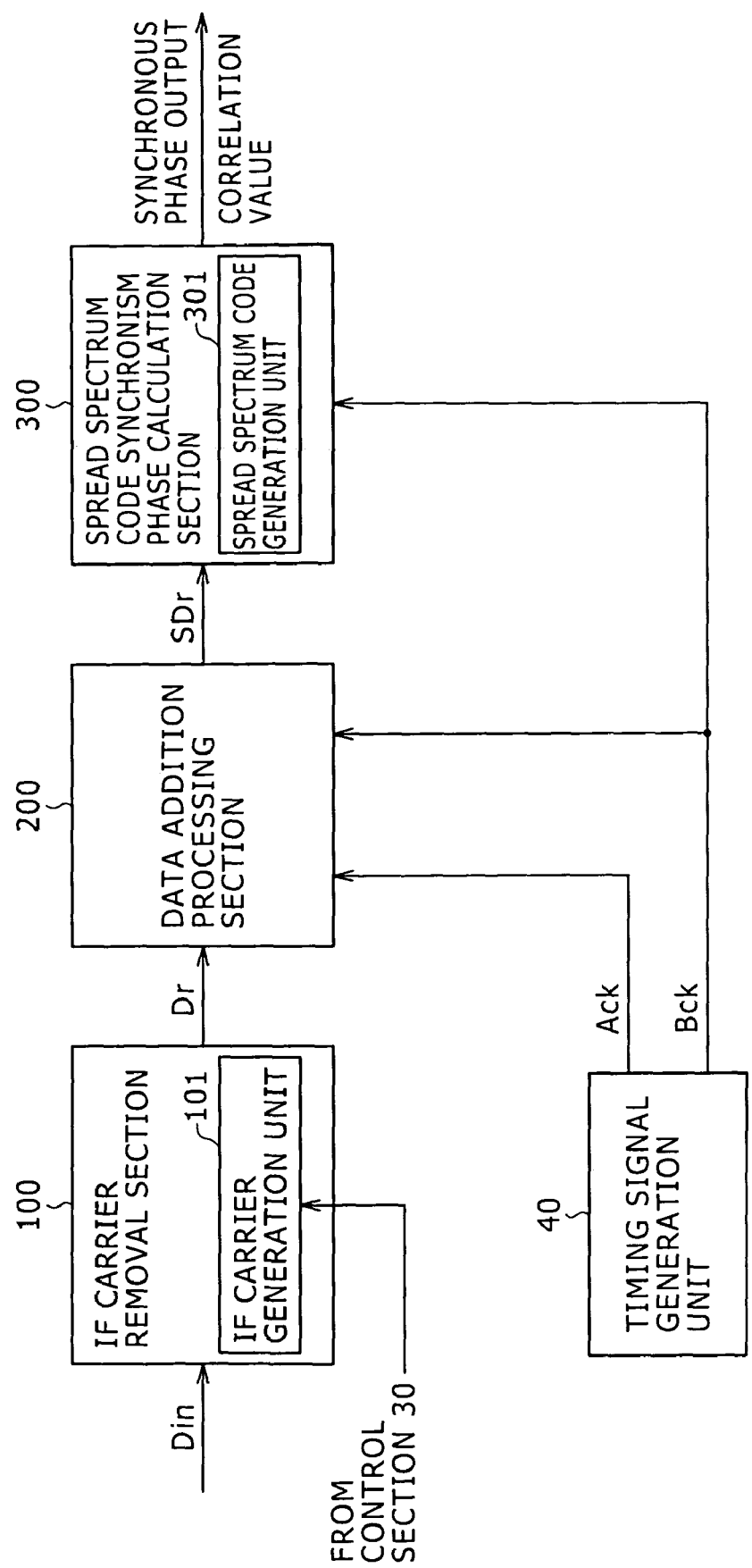
FIG. 1 is a block diagram showing a first example of a configuration of a synchronization section of a satellite signal receiver apparatus to which the present invention is applied.

FIG. 1 shows a general configuration of the synchronization section of the synchronization and holding section 20 in the present embodiment. Referring to FIG. 1, the synchronization section shown includes an IF carrier removal section 100, a data addition processing section 200, and a spread spectrum code synchronous phase calculation section 300.

The IF carrier removal section 100 removes an IF carrier frequency component from IF data Din from the frequency conversion section 10. The IF carrier removal section 100 includes an IF carrier generation unit 101 as hereinafter described. The IF carrier generation unit 101 is controlled with a control signal from the control section 30 to generate a signal of an IF carrier frequency determined taking a Doppler frequency and a built-in oscillator error into consideration. The IF carrier removal section 100 multiplies the IF data Din by the signal of the IF carrier frequency from the IF carrier generation unit 101 to remove the IF carrier frequency component from the IF data Din.

Then control section 30 generates a control signal for causing an IF carrier signal, which has an IF carrier frequency calculated taking orbit information stored in the orbit information memory 36, an oscillation frequency error of the oscillator, a speed of movement of the satellite signal receiver apparatus itself and so forth into consideration, to be outputted from the IF carrier generation unit 101. The control section 30 supplies the control signal generated in this manner to the IF carrier generation unit 101.

Consequently, a signal of an IF carrier frequency, which is changed and controlled in response to the orbit of the corresponding satellite and the position of the satellite signal receiver apparatus itself which vary momentarily, is obtained from the IF carrier generation unit 101. The signal of the IF carrier frequency is supplied to the IF carrier removal section 100, by which an IF carrier removing process is performed favorably.

IF data Dr from which an IF carrier component is removed by the IF carrier removal section 100 is supplied to the data addition processing section 200. The data addition processing section 200 includes a memory having a capacity to store IF data Dr for one period of spread signals and an addition section.

The data addition processing section 200 uses the addition section to add a signal of IF data Dr from the IF carrier removal section 100 for every interval of one period of spread spectrum codes and a signal which is stored in the memory till then and has the same phase at intervals of spread spectrum codes. Then, the data addition processing section 200 writes a result of the addition back into the memory. The data addition processing section 200 repeats such addition and writing back by a number of times equal to a plurality of periods of spread spectrum codes.

Consequently, the data addition processing section 200 accumulates sums of IF data Dr, from which a carrier frequency component is removed, for a plurality of periods of spread spectrum codes at intervals of a period of spread spectrum codes into the memory.

Then, after the IF data Dr are added and stored for the plural periods of spread spectrum codes into the memory in this manner, the data addition processing section 200 reads out the sum data SDr from the memory and supplies the sum data SDr to the spread spectrum code synchronous phase calculation section 300.

The spread spectrum code synchronous phase calculation section 300 multiplies the sum data SDr and the spread spectrum code from the spread spectrum code generation unit of the receiver side to perform correlation calculation so that a correlation value for one phase of spread spectrum codes is obtained. Then, an initial phase for a spread spectrum code from the spread spectrum code generation unit is displaced, or a reading out initial position from the memory of the data addition processing section 200 is changed, and then the sum data SDr is multiplied by the spread spectrum code from the spread spectrum code generation unit of the receiver side again to perform correlation calculation thereby to obtain a correlation value of the different phase of spread spectrum codes. Correlation values regarding all phases of the spread spectrum code are examined in a similar manner.

Figure 26:
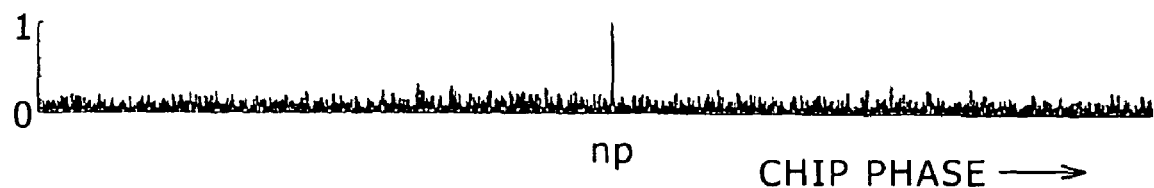
FIG. 26 is a waveform diagram illustrating an example of a correlation result between a satellite signal and a spread spectrum code.

Then, the spread spectrum code synchronous phase calculation section 300 performs a process of comparing the correlation values in order and normally updating each higher correlation value as a maximum correlation value. Thus, the calculated maximum correlation value is detected as a phase of spread spectrum codes of the receiver side which are in synchronism with the spread spectrum codes of the satellite signal as seen in FIG. 26.

The spread spectrum code synchronous phase calculation section 300 outputs the detected synchronous phase output of the spread spectrum codes and the correlation value at the phase.

A timing signal generation unit 40 includes the reference oscillation circuit 42 and the multiplying/dividing circuit 43. In the present embodiment, the timing signal generation unit 40 supplies, as a processing clock with which the data addition processing section 200 successively adds IF data Dr and stores resulting data into the memory, a sampling clock frequency for IF data Din or a clock Ack, for example, of 4.092 MHz synchronized with the IF data Dr. Further, the timing signal generation unit 40 supplies, as a clock with which accumulated sum data are to be read out from the memory, a clock Bck of a frequency higher than that of the clock Ack, for example, a clock Bck of 55.242 MHz.

As described hereinabove, the code length of the spread spectrum code is 1,023 (1,023 chips). However, in the present example, the frequency of the sampling clock Ack for IF data is 4.092 MHz. Therefore, IF data Din is supplied as data of a unit of a ¼ chip of the spread spectrum code to the IF carrier removal section 100, and consequently, 4,092 samples per one period of spread spectrum codes are supplied to the IF carrier removal section 100. Further, IF data Dr from which an IF carrier is removed is supplied from the IF carrier removal section 100 to the data addition processing section 200.

The timing signal generation unit 40 performs correlation calculation regarding accumulated sum data read out from the memory of the data addition processing section 200 and supplies the clock Bck as a processing clock for the detection of a synchronous phase to the spread spectrum code synchronous phase calculation section 300.

In the present embodiment, since sum data for a plurality of periods of spread spectrum codes are stored in the memory of the data addition processing section 200, the clock to be used when the stored sum data is to be read out from the memory so that correlation calculation and synchronous phase detection are performed by the spread spectrum code synchronous phase calculation section 300 need not be in synchronism with the IF data Dr. Consequently, a high rate clock can be used as the clock.

Now, several examples of a particular configuration of the IF carrier removal section 100, data addition processing section 200 and spread spectrum code synchronous phase calculation section 300 of the synchronous acquisition section of FIG. 1 are described successively.

[Example of a Configuration of the IF Carrier Removal Section and First Example of a Configuration of the Data Addition Processing Section]

Figure 3:
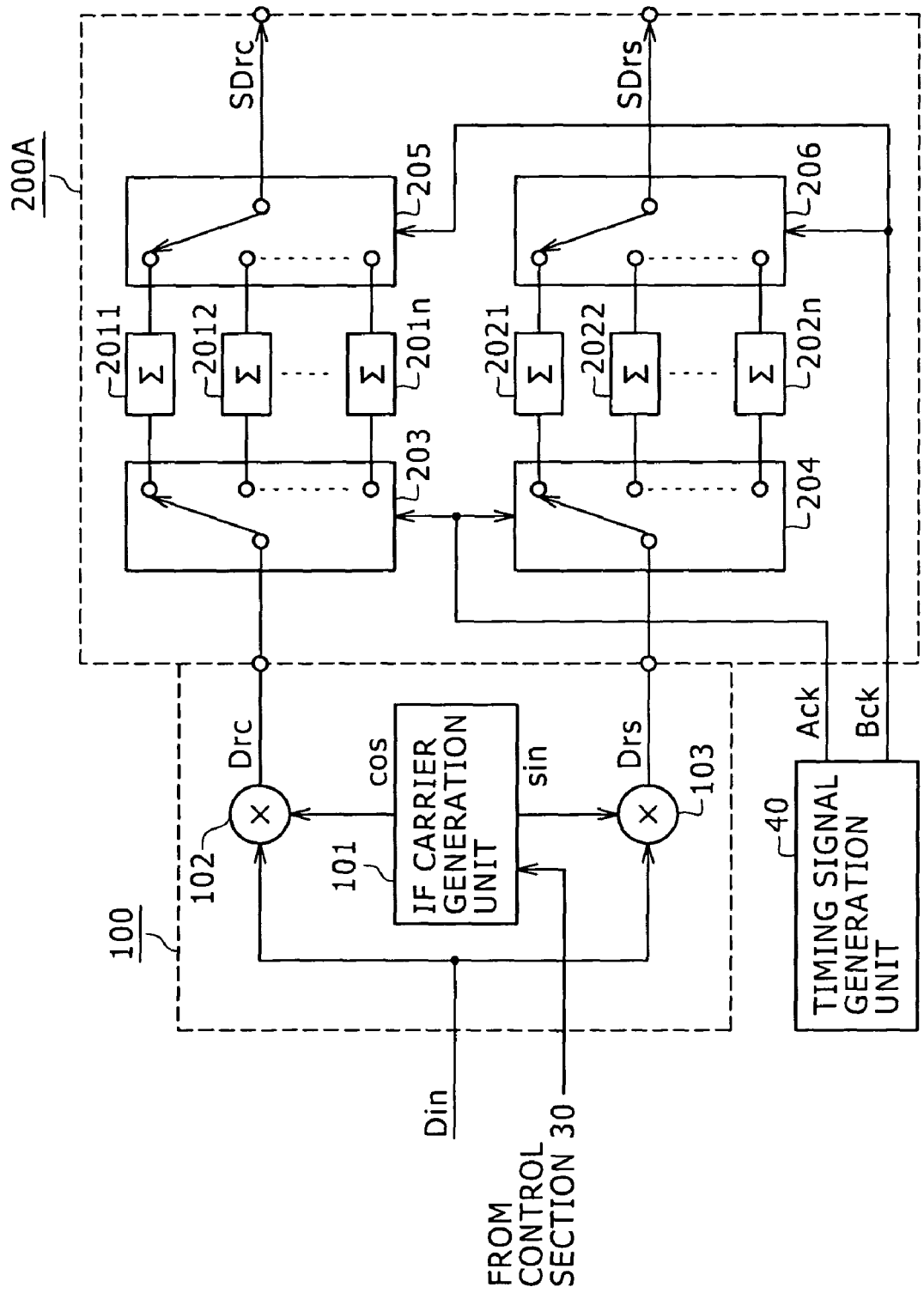
FIG. 3 is a block diagram showing a first example of a configuration of an IF carrier removal section and a data addition processing section of the synchronization section of FIG. 1.

FIG. 3 shows an example of a configuration of the IF carrier removal section 100 and a first example of a configuration of the data addition processing section 200. The data addition processing section of the first example is denoted by 200A.

In the IF carrier removal section 100, IF data Din is multiplied by a signal of an IF carrier frequency generated taking a Doppler frequency and a self oscillator error into consideration to perform removal of an IF carrier frequency component from the IF data Din. In this instance, since the phase of the IF carrier frequency signal of the IF data Dr is unknown, both of a sine wave component and a cosine wave component are used to perform the IF carrier removal process.

To this end, in the IF carrier removal section 100 of the example of FIG. 3, the IF data Din are inputted to both of a multiplier 102 for a sine wave component and another multiplier 103 for a cosine wave component. Then, a cosine wave component of the IF carrier frequency signal produced taking a Doppler frequency and a built-in oscillator error into consideration from the IF carrier generation unit 101 is supplied to the multiplier 102 while a sine wave component of the IF carrier frequency signal is supplied to the multiplier 103.

Then, the cosine wave component and the sine wave component are multiplied by the IF data Din by the multipliers 102 and 103, respectively.

Then, a cosine wave component Drc and a sine wave component Drs of the IF data Dr, from which the IF carrier component is removed, are obtained from the multipliers 102 and 103, respectively, and supplied to the data addition processing section 200A.

In the example of FIG. 3, the data addition processing section 200A includes n summing integrators $201_1$, $201_2$, ..., $201n$ (n is a positive integer) and n summing integrators $202_1$, $202_2$, ..., $202n$ for one period of spread spectrum codes for the IF data Drc and Drs from which the IF carrier frequency is removed, respectively. In the present example, the sampling frequency of the IF data Dr is 4,092 MHz, and the amount of data for one period (1 msec) of spread spectrum codes is data of 4,092 samples. Therefore, n=4,092.

Further, in the data addition processing section 200A of the present example, the IF data Drc is supplied to the summing integrators $201_1$, $201_2$, ..., $201n$ through a switch circuit 203 while the IF data Drs is supplied to the summing integrators $202_1$, $202_2$, ..., $202n$ through another switch circuit 204.

The switch circuits 203 and 204 are successively changed over to the n summing integrators $201_1$, $201_2$, ..., $201n$ and the n summing integrators $202_1$, $202_2$, ..., $202n$ in synchronism with the clock Ack. Then, such successive changeover of the n summing integrators $201_1$, $201_2$, ..., $201n$ and the n summing integrators $202_1$, $202_2$, ..., $202n$ is repeated after every one period of spread spectrum codes.

Accordingly, signals of the IF data Drc and Drs for every one-period interval of spread spectrum codes are supplied normally in the following manner. In particular, the top sample data of the signals are supplied to the summing integrators $201_1$ and $202_1$; the second sample data are supplied to the summing integrators $201_2$ and $202_2$; ... ; and the nth sample data are supplied to the summing integrators $201n$ and $202n$.

Then, each of the summing integrators $201_1$ to $201n$ and $202_1$ to $202n$ cumulatively adds sample data of the same phase within successive one-period intervals of spread spectrum codes supplied thereto. This cumulative addition is performed within an addition interval SUM corresponding to a plurality of periods of spread spectrum codes.

The length of the addition interval SUM corresponding to a plurality of periods of spread spectrum codes within which the cumulative addition is to be preformed in this example can be set by the user. In particular, the addition interval SUM can be set, for example, in a unit of 1 msec within a range of 1 to 31 msec (1 msec corresponds to one period of spread spectrum codes). However, while the satellite signal receiver apparatus is operating with power supplied thereto, the addition interval SUM is held from being changed. It is to be noted that, although 1 msec can be selected as the time length of the addition interval SUM, this is for the convenience of design, and in order to allow the apparatus to exhibit its advantages, a period of 2 msec or more is selected.

Figure 4:
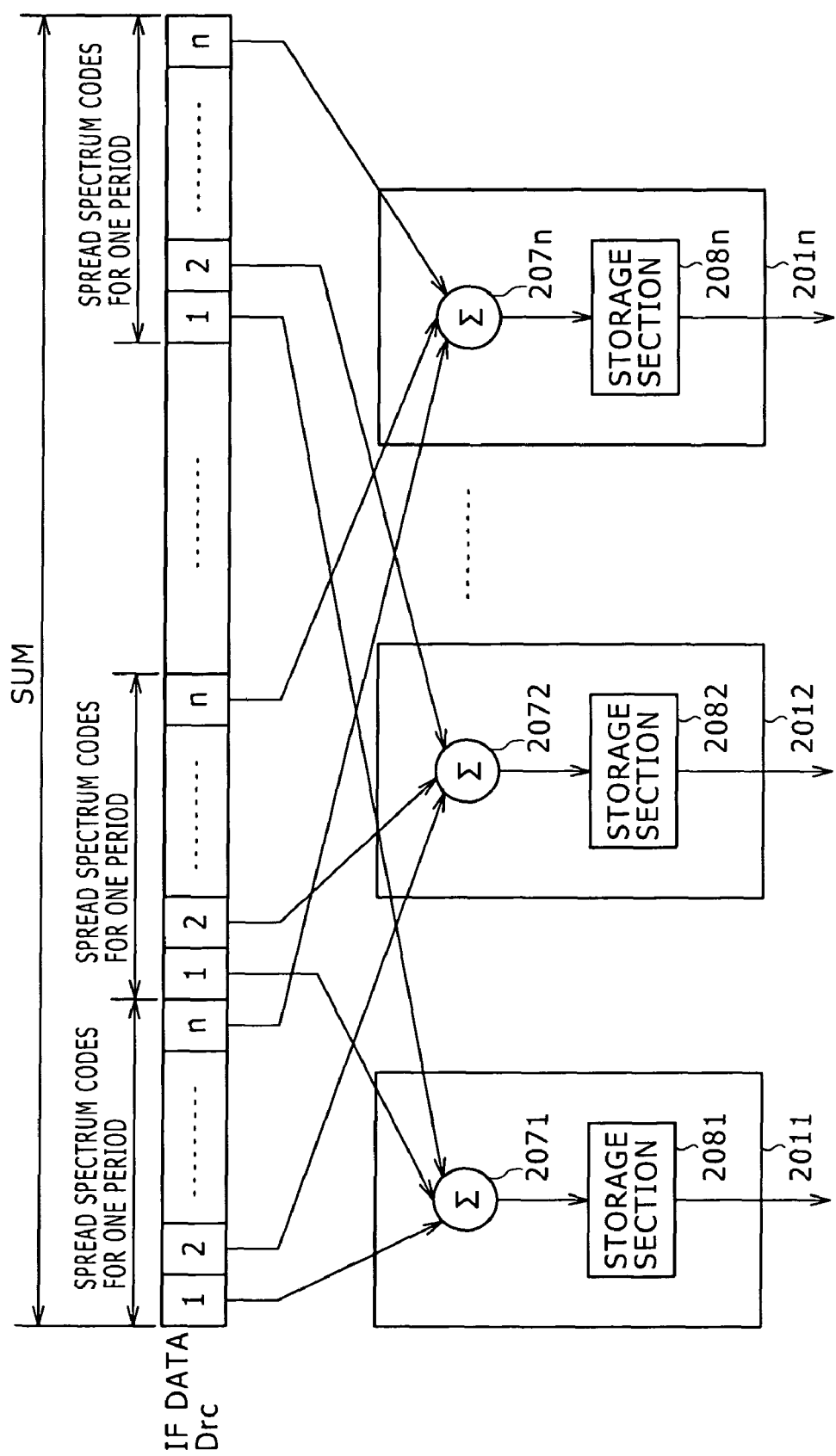
FIG. 4 is a diagrammatic view illustrating operation of the IF carrier removal section and the data addition processing section of FIG. 3.

The cumulative addition process is further described with reference to FIG. 4. It is to be noted that FIG. 4 illustrates the data addition process regarding the cosine wave component Drc of IF data. However, also the data addition process regarding the sine wave component Drs of IF data is performed similarly.

As seen in FIG. 4, in the data addition processing section 200A, within the addition interval SUM, changeover of the switch circuit 203 for every sample data is performed repetitively and similarly after every one-period interval of spread spectrum codes. Consequently, cosine wave components Drc of IF data are delimited in a unit of a one-period interval of spread spectrum codes and repetitively supplied to the n summing integrators 2011 to 201n.

Then, as described above, within the addition interval SUM, signals of the cosine wave component Drc of the IF data are cumulatively added in the following manner through changeover of the switch circuit 203 for every sample data. In particular, the first sample data are cumulatively added by an addition section 2071 of the summing integrator 2011, and a result of the cumulative addition is written into a storage section 2081 formed from a register having a capacity, for example, of 5 bits. Similarly, the second sample data are cumulative added by an addition section 2072 of the summing integrator 2012, and a result of the cumulative addition is written into a storage section 2082 formed from a register having a capacity, for example of 5 bits. Then, the nth sample data are cumulatively added by the addition section 207n of the summing integrator 201n, and a result of the cumulative addition is written into a storage section 208n formed from a register having a capacity, for example, of 5 bits.

In this manner, results of addition of sample data of the cosine wave component Drc of the IF data at the same phase within a one-period interval of spread spectrum codes within the addition interval SUM are stored in the storage sections 2081 to 208n of the summing integrators 2011 to 201n.

The sum data accumulated in the summing integrators 2011 to 201n and 2021 to 202n in such a manner as described above are read out, in the present first example, through switch circuits 205 and 206 within a calculation interval CAL after the addition interval SUM as seen in FIG. 5A. The data read out in this manner are supplied as addition result data SDrc and SDrs to the spread spectrum code synchronous phase calculation section 300.

At this time, the switch circuits 205 and 206 successively changeover the summing integrators 2011 to 201n and 2021 to 202n in response to every one clock similarly to the switch circuits 203 and 204 so that the addition result data SDrc and SDrs for one period of spread spectrum codes are repetitively read out and supplied to the spread spectrum code synchronous phase calculation section 300. It is to be noted that the clock supplied from the timing signal generation unit 40 to the switch circuits 205 and 206 is the clock Bck which is higher than the sampling clock Ack as described hereinabove.

As hereinafter described, the spread spectrum code synchronous phase calculation section 300 includes a spread spectrum code generation unit of the receiver side and multiplies a spread spectrum code from the spread spectrum code generation unit by the addition result data SDrc and SDrs to calculate a correlation value of them. In the present example, every time the addition result data SDrc and SDrs are read out by an amount corresponding to one period of spread spectrum codes, the spread spectrum code synchronous-phase calculation section 300 displaces the initial phase for a spread spectrum code to be generated and calculate the correlation value regarding each phase. In the present example, the addition result data SDrc and SDrs are read out by 4,092 times, and the initial phase for a spread spectrum code from the spread spectrum code generation unit is successively displaced in a unit of a ¼ chip phase to 4,092 different phases, and the correlation value at each phase is calculated.

Then, the spread spectrum code synchronous phase calculation section 300 detects, from among the phases, that phase whose correlation value exhibits the highest value as seen in FIG. 26, and detects the phase as a synchronous phase with the spread spectrum codes of the satellite reception signal.

It is to be noted that, in place of successively displacing the initial phase of the spread spectrum code to be generated from the spread spectrum code generation unit, the summing integrators from which addition result data is to be read out first from among the n summing integrators 2011 to 201n and the n summing integrators 2021 to 202n may be successively displaced.

In the first example, if the calculation interval CAL comes to an end, then the stored substance of the storage sections of all of the summing integrators 2011 to 201n and 2021 to 202n is cleared, and then another addition interval SUM is entered. Then, the process in the addition interval SUM and the process in a succeeding calculation interval CAL are repeated. In other words, as seen in timing charts of FIGS. 5A to 5E, in the present first example, the processes in an addition interval SUM and a calculation interval CAL are repetitively performed.

For example, a changeover signal SW1 for changeover between the addition interval SUM and the calculation interval CAL is generated by the control section 30. Though not shown, the thus generated changeover signal SW1 is supplied to the summing integrators 2011 to 201n and the summing integrators 2021 to 202n such that, within the addition interval SUM, writing of data into the storage sections 2081 to 208n is enabled to allow the addition process to be executed, but within the calculation interval CAL, reading out of data from the storage sections 2081 to 208n of the summing integrators 2011 to 201n and the summing integrators 2021 to 202n is enabled so that the addition result data SDrc and SDrs are outputted to the spread spectrum code synchronous phase calculation section 300.

Accordingly, as seen from FIG. 5B, within an addition interval SUM, IF data Din is fetched through the IF carrier removal section 100 and multiplied by the produced IF carrier frequency signal to remove the IF carrier. At this time, as seen in FIG. 5C, for the produced IF carrier frequency signal, one frequency is set to one addition interval SUM.

Here, 4092×N in FIG. 5B signifies that 4,092 sample data of the IF data Din are fetched for N periods of spread spectrum codes.

Further, as seen in FIG. 5D, within each addition interval SUM, an addition process is performed by the data addition processing section 200A and addition result data SDrc and SDrs are accumulated into the storage sections 2081 to 208n of the summing integrators 2011 to 201n and the summing integrators 2021 to 202n, respectively.

Then, within a next calculation interval CAL, the addition result data SDrc and SDrs are read out at a high rate by 4,092 times in response to the clock Bck from the storage sections 2081 to 208n of the summing integrators 2011 to 201n and the summing integrators 2021 to 202n to perform correlation calculation.

FIG. 4 shows an example of a configuration in principle of the data addition processing section 200A. In the example of FIG. 4, 4,092 adders are required. On the other hand, another example of a configuration of the data addition processing section 200A shown in FIG. 6 is simplified in configuration in that the number of adders for each of input IF data Drc and Drs is reduced to the lowest number of 1. It is to be noted that the suffix c added to the reference character of each block indicates that the block is a processing block for the cosine wave component, and the suffix s added to the reference character of each block indicates that the block is a processing block for the sine wave component.

In the configuration example of FIG. 6, for IF data Drc and Drs, memories 214c and 214s having n (=4,092) memory address regions and one adder 211c and 211s are provided, respectively, in place of n (=4,092) summing integrators corresponding to one period of spread spectrum codes. Further, in place of the switch circuits 203 and 205 and the switch circuits 204 and 206, memory address region changeover circuits 213c, 215c and 213s, 215s are provided.

Then, the sampling clock Ack is supplied as a changeover timing signal to the memory address region changeover circuits 213c and 213s. Meanwhile, the sampling clock Ack and the high rate clock Bck are supplied to the memory address region changeover circuits 215c and 215s such that they are changed over by a switch circuit 217 between summing integration and reading out of addition result data. In other words, to the memory address region changeover circuits 215c and 215s, the sampling clock Ack is supplied through the switch circuit 217 upon a summing integration process, but the high rate clock Bck is supplied through the switch circuit 217 upon reading out of addition result data. The switch circuit 217 is changed over with the signal SW1 described hereinabove.

Gate circuits 212c and 212s are provided between the adders 211c and 211s and the memory address changeover circuits 213c and 213s, respectively, and are opened (turned on) upon summing integration processing but are closed (turned off) upon reading out of addition result data. Further, gate circuits 216c and 216s are provided between the memory address changeover circuits 215c and 215s and the spread spectrum code synchronous phase calculation section 300, respectively, and are closed (turned off) upon summing integration processing but are opened (turned on) upon reading out of addition result, data.

The signal SW1 described hereinabove is supplied as a gate opening/closing control signal to the gate circuits 212c and 212s, and a signal SW2 obtained by reversing the polarity of the changeover signal SW1 is supplied as a gate opening/closing control signal to the gate circuits 216c and 216s.

Then, upon summing integration processing, the memory address regions of the memories 214c and 214s are successively changed over by the memory address region changeover circuits 213c, 215c and 213s, 215s, respectively, in response to the data sampling clock Ack in a unit of a one-period interval of spread spectrum codes in a similar manner to the switch circuits 203 and 204 described above. Consequently, the data stored in the designated address regions are read out and added to the input data by the adders 211c and 211s, and results of the addition are written back into the designated address regions. This is repeated within the addition interval SUM so that sample data of spread spectrum codes at the same phase in units of a one-period interval are added and stored into the same address regions.

Then, the memory address regions of the memories 214c and 214s are successively changed over at a high speed by the memory address region changeover circuits 215c and 215s in response to the high rate clock Bck of a high rate similarly to the switch circuits 205 and 206 described hereinabove, respectively. Consequently, the addition result data accumulated in the memories 214c and 214s are successively read out from the changed over memory addresses and signaled to the spread spectrum code synchronous phase calculation section 300. The reading out process is performed repetitively by 4,092 times.

It is to be noted that, in the case of the present example, the memory address regions of the memories 214c and 214s from which addition result data are to be read out are displaced in place of successively displacing the initial phase of a spread spectrum code to be generated from the spread spectrum code generation unit of the spread spectrum code synchronous phase calculation section 300.

In the following, processing operation of the configuration example of FIG. 6 is successively described with reference also to a timing chart of FIG. 7.

In particular, in the configuration example of FIG. 6, the switch circuit 217 is changed over to the state shown, that is, to the clock Ack side, within an addition interval SUM. In this state, the memory address changeover circuits 213c and 213s and the memory address changeover circuits 215c and 215s successively change over the memory addresses of the memories 214c and 214s in response to each one clock of the sampling clock Ack as seen in FIG. 7A.

In this instance, the memory address regions of the memories 214c and 214s designated for changeover by the memory address changeover circuits 213c and 213s on the writing side are same as the memory addresses designated for changeover by the memory address changeover circuits 215c and 215s on the reading out side.

Further, in the present example, the front half of one clock period of the sampling clock Ack is set as a reading out access interval for the memories 214c and 214s while the rear half is set as a writing access interval as seen in FIG. 7A. It is to be noted that, within the addition interval SUM, the gate circuits 216c and 216s are off and consequently the data read out are not outputted.

The IF data Drc and Drs are individually supplied to one input terminal of the adders 211c and 211s, respectively. Meanwhile, to the other input terminal of the adders 211c and 211s, data (sum data) read out from the memory address regions designated for changeover of the memories 214c and 214s and received from the memory address changeover circuits 215c and 215s are supplied, respectively. Accordingly, the adders 211c and 211s add data samples of the IF data Drc and Drs supplied to the one input terminal thereof and the data read out from the memories 214c and 214s, respectively.

Then, the sum output data of the adders 211c and 211s are supplied to the address changeover circuits 213c and 213s through the gate circuits 212c and 212s, which are open within the addition interval SUM described hereinabove, respectively. At this time, the address changeover circuits 213c and 213s designate the address regions of the memories 214c and 214s from which the stored data have been read out, Thus, the sum data from the adders 211c and 211s are written back into the designated memory address regions within the writing access interval of the rear half of the one-clock period of the sampling clock Ack described hereinabove.

After the writing back of the data into one of the memory address regions, the memory address regions of the memories 214c and 214s to be designated by the memory address region changeover circuits 213c, 213s and 215c, 215s are changed in synchronism with the arriving timing of next input IF data Drc and Drs. Then, the processes of reading out of data from the memories 214c and 214s, addition of the read out data and input data and writing back of a result of the addition into the memory address regions are performed in a similar manner as described above.

In this manner, within an addition interval SUM which corresponds to a plurality of periods of spread spectrum codes, accumulated sum data of sample data having the same phase in units of a one-period interval of spread spectrum codes are stored individually in the n memory address regions of the memories 214c and 214s.

Then, when a calculation interval CAL is entered next to the addition interval SUM, the gate circuits 212c and 212s are closed (turned off) while the gate circuits 216c and 216s are opened (turned on) in accordance with the changeover control signals SW1 and SW2. Further, the switch circuit 217 is changed over to the opposite side to the position shown in FIG. 6, that is, to the clock Bck side so that now the high rate clock Bck is supplied to the memory address region changeover circuits 215c and 215s. Then, within the calculation interval CAL, the memories 214c and 214s have only a reading out access interval within a one-clock period of the high rate clock Bck.

Then, the memory address region changeover circuits 215c and 215s successively change over the memory addresses in synchronism with the high rate clock Bck. Consequently, data of n addition results are read out in a unit of sample data from the n (=4,092) memory address regions of the memories 214c and 214s and supplied as addition result data SDrc and SDrs to the spread spectrum code synchronous phase calculation section 300 through the gate circuits 216c and 216s, respectively.

In this instance, data of n (=4,092) addition results are repetitively outputted by n (=4,092) times as seen in FIG. 7B. The reason why the data are read out repetitively by the n times is that it is necessary to perform correlation calculation with n spread spectrum codes of different phases from the spread spectrum code generation unit.

Then, in the spread spectrum code synchronous phase calculation section 300, the addition result data in each reading out cycle are successively multiplied by spread spectrum codes of different initial phases for one period from the spread spectrum code generation unit to perform correlation calculation. In FIG. 7B, spread spectrum codes PN(0), PN(1), PN(2), PN(3), ..., PN(i) (where i=0 to 4,091), ... indicate spread spectrum codes on the receiver side for one period whose initial phase is successively displaced by a ¼ chip.

Then, if any of correlation values between the spread spectrum codes PN(0), PN(1), PN(2), PN(3), ... on the receiver side and the addition result data is higher than a threshold value as described hereinabove, then the spread spectrum code PN(i) is detected as a spread spectrum code on the receiver side of a phase synchronized with the spread spectrum code of the satellite signal. Then, the phase of the detected spread spectrum code PN(i) is outputted as a synchronous phase together with the correlation value of the same.

It is to be noted that, while, in the description given above with reference to FIG. 7B, the initial phase of the spread spectrum code from the spread spectrum code generation unit on the receiver side is successively changed, the initial value of the memory address when addition result data are to be read out from the memories 214c and 214s may be changed one by one address for every one-cycle period of spread spectrum codes in place of changing the phase of the spread spectrum code on the reception side. In other words, the memory address may be displaced successively such that, for the first one cycle of spread spectrum codes, the initial value for the memory address is set to 0; for the second one cycle of spread spectrum codes, the initial value for the memory address is set to 1; for the third one cycle of spread spectrum codes, the initial value for the memory address is set to 2; ....

Figure 8:
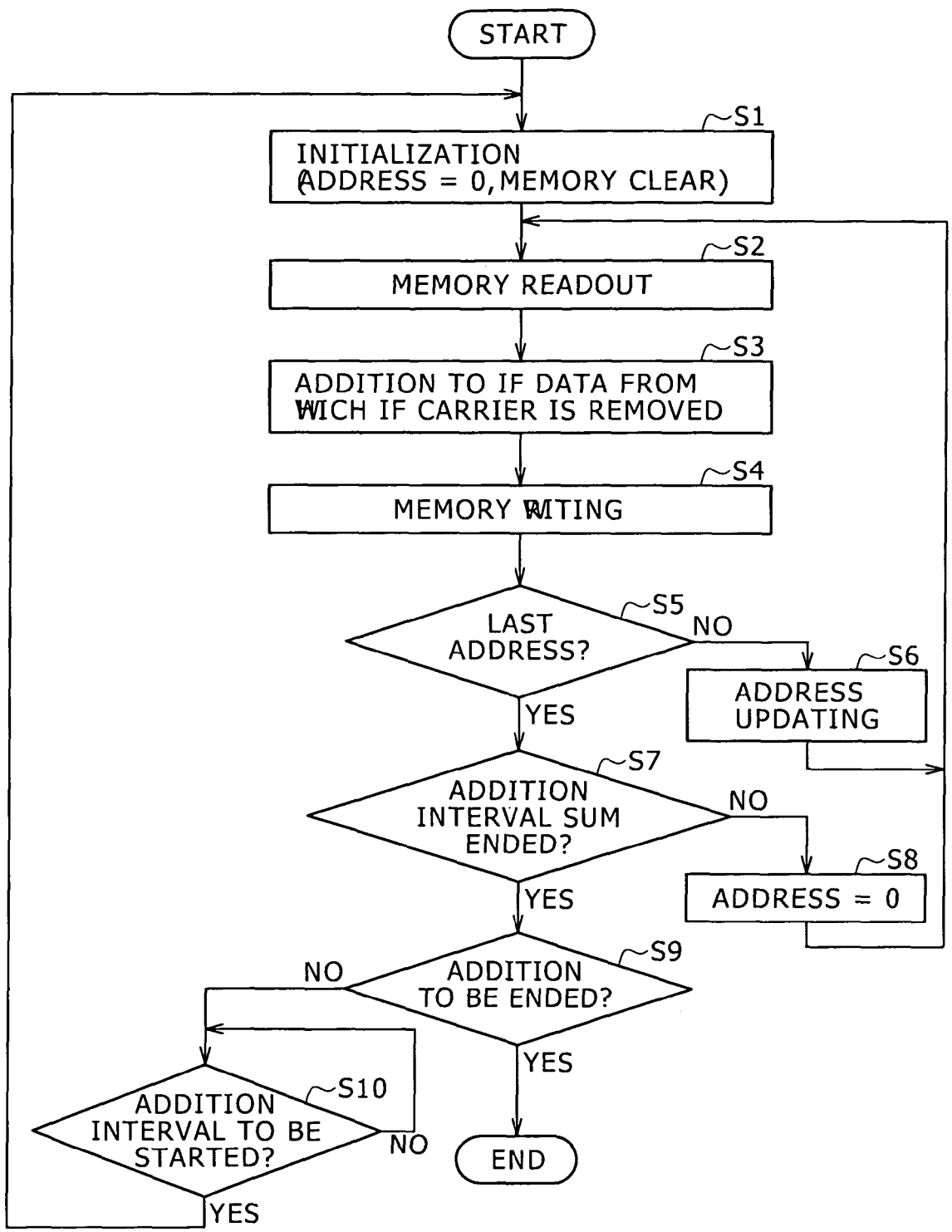
FIG. 8 is a flow chart illustrating operation of the data addition processing section of FIG. 6.

The data addition process in the foregoing description is described below with reference to a flow chart of FIG. 8. Address control of the memories 214c and 214s in the flow chart of FIG. 8 corresponds to a process executed by a memory address control section where it is assumed that the memory address control section is provided for the memories 214c and 214s and includes the memory address region changeover circuits 213c and 213s and 215c and 215s.

First, at step S1, an initialization process is performed. In particular, the substance of all memory address regions of the memories 214c and 214s are cleared and the memory address region changeover circuits 213c, 213s and 215c, 215s are changed over so that the first address=0 is selected as the designated addresses.

Then at step S2, data are read out from the designated memory address of the memories 214c and 214s. Then at step S3, the read out data from the memories 214c and 214s are added to IF data Drc and Drs from which an IF carrier is removed by the IF carrier removal section 100, respectively. Further, at step S4, results of the addition are written back into the designated memory address of the memories 214c and 214s.

Thereafter, it is decided at step S5 whether or not the designated memory address is the last address among memory addresses for one period of spread spectrum codes of the memories 214c and 214s. If it is decided at step S5 that the designated memory address is not the last address, then the memory address for the memories 214c and 214s is advanced by one, that is, updated, at step S6. Thereafter, the processing returns to step S2 so that the processes at the steps beginning with step S2 are executed repetitively.

On the other hand, if it is decided at step S5 that the designated memory address is the last address, then this signifies that the fetching process of the IF data Drc and Drs for a one-period interval of spread spectrum codes and the addition process of the fetched IF data Drc and Drs and the addition result data stored in the memories 214c and 214s are completed. At this time, it is decided at step S7 whether or not the addition interval SUM ends.

If it is decided at step S7 that the addition interval SUM does not end, then the memory address for the memories 214c and 214s is set to the initial value (=0) at step S8 in order to subsequently execute an addition process for next IF data Drc and Drs for one period of spread spectrum codes. Thereafter, the processing returns to step S2 so that the processes at the steps beginning with step S2 are executed repetitively.

On the other hand, if it is decided at step S7 that the addition interval SUM ends, then it is decided at step S9 whether or not the addition calculation for synchronization is to be ended. If it is decided that the addition calculation is not to be ended, then a next addition interval SUM is waited at step S10. Then, when a next addition interval SUM comes, the processing returns to step S1 so that the processes at the steps beginning with step S1 are executed repetitively. On the other hand, if it is decided at step S9 that the addition calculation is to be ended, then the processing routine is ended.

[First Example of a Configuration of the Spread Spectrum Code Synchronous Phase Calculation Section]

Figure 9:
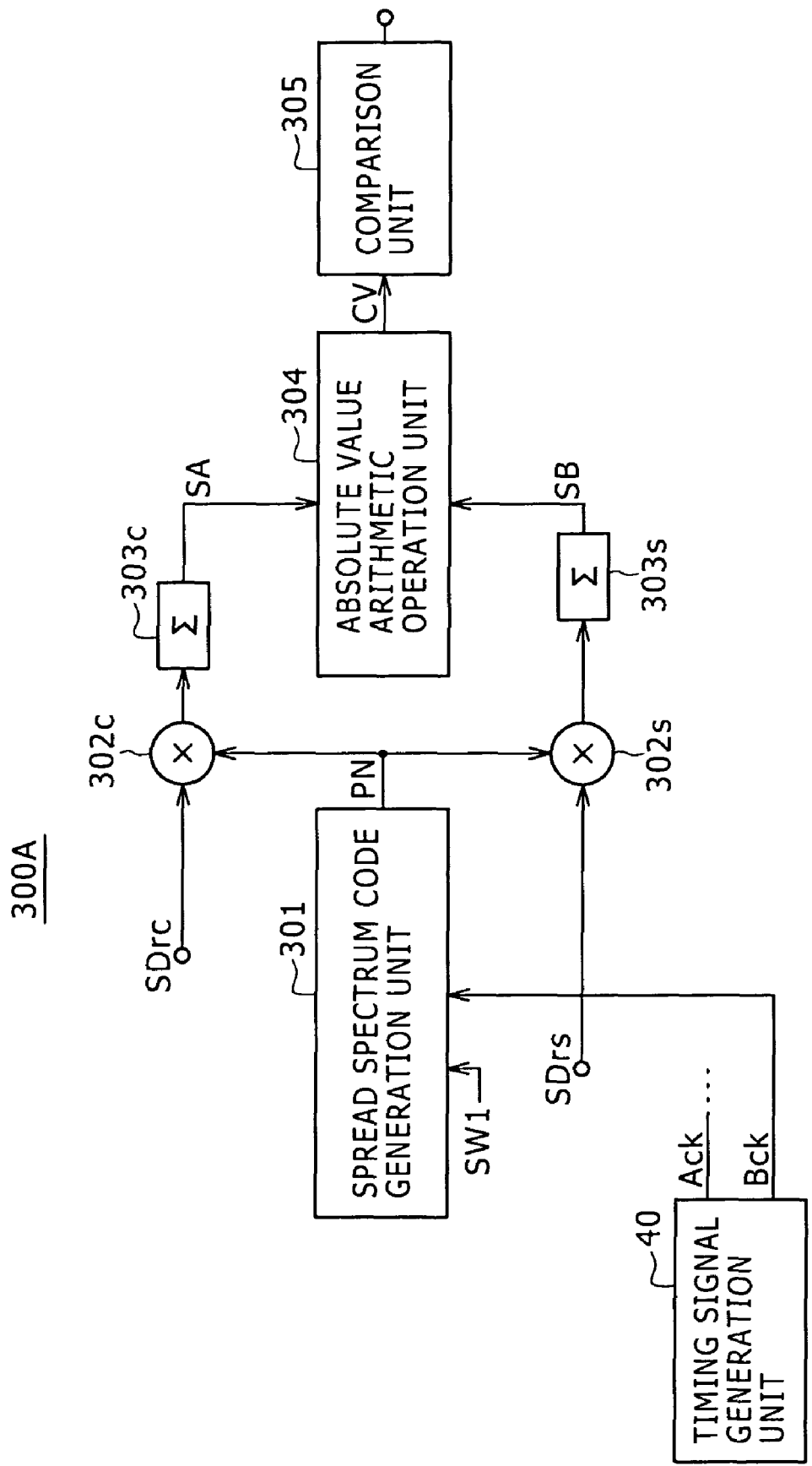
FIG. 9 is a block diagram showing a first example of a configuration of a spread spectrum code synchronism calculation section of the synchronization section of FIG. 1.

FIG. 9 shows a first example of a configuration of the spread spectrum code synchronous phase calculation section. The spread spectrum code synchronous phase calculation section of the first example is denoted by 300A.

Referring to FIG. 9, the spread spectrum code synchronous phase calculation section 300A of the first example includes a single spread spectrum code generation unit 301, and a pair of multipliers 302c and 302s for correlation calculation. The spread spectrum code synchronous phase calculation section 300A further includes a pair of integrators 303c and 303s for performing summing integration of multiplication results in a unit of a data sample, an absolute value arithmetic operation unit 304, and a comparison unit 305.

In the present example, the signal SW1 for changing over between the addition interval SUM and the calculation interval CAL and the high rate clock Bck from the timing signal generation unit 40 are supplied to the spread spectrum code generation unit 301. The spread spectrum code generation unit 301 generates spread spectrum codes PN on the reception side in synchronism with the high rate clock Bck only within the calculation interval CAL. Then, in the present example, the spread spectrum code generation unit 301 successively displaces the initial phase for a spread spectrum code PN to be generated, in the present example, by a ¼ chip for every one period of spread spectrum codes.

In particular, the spread spectrum code generation unit 301 successively generates spread spectrum codes PN(0), PN(1), PN(2), . . . , whose initial phase is successively displaced by a ¼ chip, for every one period of spread spectrum codes PN as seen in FIG. 7B.

Then, a cosine wave component SDrc of addition result data from the data addition processing section 200 (which is not limited to the data addition processing section 200A but may be any of the other data addition processing sections hereinafter described) and a spread spectrum code PN from the spread spectrum code generation unit 301 are multiplied by the multiplier 302c in a unit of a data sample. Then, a result of the multiplication is cumulatively added in the integrator 303c over one period of spread spectrum codes.

Meanwhile, a sine wave component SDrs of the addition result data from the data addition processing section 200 and the spread spectrum code PN from the spread spectrum code generation unit 301 are multiplied by the multiplier 302s, and a result of the multiplication is cumulatively added over the one period of spread spectrum codes.

It is to be noted that the values of the integrators 303c and 303s are cleared every time the initial phase for a spread spectrum code PN from the spread spectrum code generation unit 301 changes. Accordingly, in the integrators 303c and 303s, correlation values of a spread spectrum code PN from the spread spectrum code generation unit 301 with a reception signal are cumulatively added over one period for each of different initial phases.

After the cumulative addition of spread spectrum codes of a certain initial phase for one period in the integrators 303c and 303s ends, before the cumulative sums are cleared, they are supplied to the absolute value arithmetic operation unit 304. Consequently, the absolute value arithmetic operation unit 304 arithmetically operates and determines a correlation value CV between the spread spectrum code and the spread spectrum code of the reception signal.

Here, an integration output SA of the integrator 303c and an integration output SB of the integrator 303s can be regarded as corresponding to a real part and an imaginary part of a complex correlation value, respectively, that is, as SA+jSB. Therefore, the absolute value arithmetic operation unit 304 arithmetically operates a square root of a square sum of the integration output SA and the integration output SB to determine the correlation value CV between the spread spectrum code PN from the spread spectrum code generation unit 301 and the spread spectrum code of the IF data of the reception signal.

In particular, where integration outputs regarding the spread spectrum code PN(i) are represented by SA(i) and SB(i), the absolute value arithmetic operation unit 304 determines the correlation value CV(i) regarding the spread spectrum code PN(i) in accordance with the following operational expression:

$$CV(i) = \{(SA(i)^2 + SB(i)_2)\}^{1/2} \quad (1)$$

Such correlation values CV(i) are successively compared by the comparison unit 305 to determine a maximum correlation value, and a synchronous phase of the spread spectrum codes of the reception signal is detected from the initial phase of the spread spectrum code generation unit 301 at the maximum correlation value. The synchronous phase detected is outputted from the comparison unit 305 and sent to the control section 30. Also the maximum correlation value CV(i) in this instance is sent to the control section 30.

Alternatively, a synchronous phase of the spread spectrum codes of the reception signal may be detected in the following manner and outputted from the comparison unit 305 to the control section 30. In particular, the comparison unit 305 compares a threshold value th set as a maximum correlation value, with which it can be decided that spread spectrum codes are in synchronism, with a maximum correlation value which has been detected till then. Then, if it is decided that the maximum correlation value CV(i) is higher than the threshold value th, then later detection action for a maximum correlation value is stopped. Then, a synchronous phase of the spread spectrum codes of the reception signal is detected from the initial phase of the maximum correlation value CV(i), which exceeds the threshold value th, in the spread spectrum code generation unit 301.

In the present example, the control section 30 passes a synchronous phase of the spread spectrum codes acquired from the synchronization section in such a manner as described above and a carrier IF frequency at the synchronous phase to the synchronism holding section. Thus, the control section 30 controls the synchronism holding section so that it may execute synchronism holding using the synchronous phase and the carrier IF frequency as initial values.

It is to be noted that, after the comparison unit 305 succeeds in detection of a phase of spread spectrum codes PN by the spread spectrum code generation unit 301 synchronized with the spread spectrum codes of the reception signal, even before spread spectrum codes PN of 4,092 different initial phases from the spread spectrum code generation unit 301 are produced, if it can be decided that correlation calculation between the spread spectrum codes PN of the other initial phases and the reception signal are unnecessary, the later correlation value arithmetic operation process by the spread spectrum code synchronous phase calculation section 300A may be stopped.

[Second Example of a Configuration of the Spread Spectrum Code Synchronous Phase Calculation Section]

Figure 10:
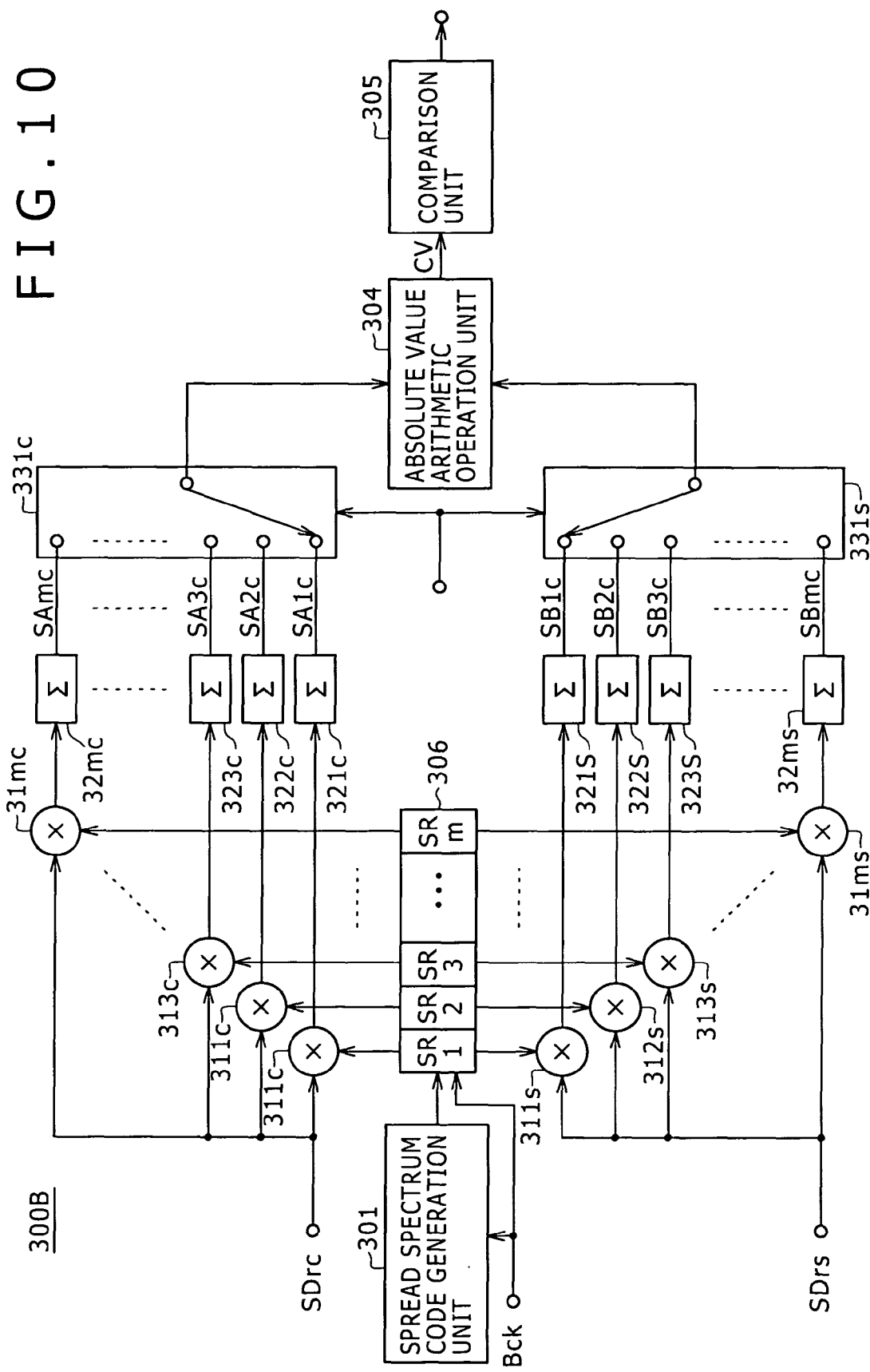
FIG. 10 is a block diagram showing a second example of a configuration of the spread spectrum code synchronism calculation section of the synchronization section of FIG. 1.

FIG. 10 shows a second example of a configuration of the spread spectrum code synchronous phase calculation section. The spread spectrum code synchronous phase calculation section of the second configuration example is denoted by 300B.

The spread spectrum code synchronous phase calculation section 300B of the second example is similar to the spread spectrum code synchronous phase calculation section 300A of the first example in that it includes a single spread spectrum code generation unit 301. However, the spread spectrum code synchronous phase calculation section 300B is different from the spread spectrum code synchronous phase calculation section 300A in that it includes a plurality of sets of a multiplier and an integrator for correlation calculation so that a plurality of correlation results between different spread spectrum codes PN and a reception signal are obtained per one period of the spread spectrum codes PN. Consequently, the spread spectrum code synchronous phase calculation section 300B of the second example can perform a correlation calculation process for addition result data at a higher rate than that in the first example.

In particular, in the spread spectrum code synchronous phase calculation section 300B of the second example, m (m is an integer equal to or higher than 2) multipliers 311c, 312c, . . . , 31mc and m integrators 321c, 322c, . . . , 32mc for a cosine wave component. Further, m multipliers 311s, 312s, . . . , 31ms and m integrators 321s, 322s, . . . , 32ms are provided for a sine wave component.

Then, a cosine wave component SDrc of addition result data from the data addition processing section 200 is supplied at the same time to the multipliers $311c, 312c, \ldots, 31mc$. Further, a sine wave component SDrs of the addition result data from the data addition processing section 200 is supplied at the same time to the multipliers $311s, 312s, \ldots, 31ms$.

Meanwhile, a spread spectrum code PN from the spread spectrum code generation unit 301 is supplied to m-stage shift register 306. Then, an output SR1 of the first stage of the shift register 306 is supplied to the multipliers $311c$ and $311s$; an output SR2 of the second stage is outputted to the multipliers $312c$ and $312s$; an output SR3 of the third stage is outputted to the multipliers $313c$ and $313s$; . . . ; and an output SRm of the mth stage is supplied to the multipliers $31mc$ and $31ms$.

Then, multiplication outputs of the multipliers $311c$, $312c, \ldots, 31mc$ are supplied to the integrators $321c$, $322c, \ldots, 32mc$, by which such multiplication outputs are cumulatively added for one period of the spread spectrum codes PN, respectively. Then, the cumulative integration values of the m integrators $321c, 322c, \ldots, 32mc$ are successively supplied to the absolute value arithmetic operation unit 304 as a result of successive changeover by a switch circuit $331c$.

Similarly, multiplication outputs of the multipliers $311s$, $312s, \ldots, 31ms$ are supplied to the integrators $321s$, $322s, \ldots, 32ms$, by which such multiplication outputs are cumulatively added for one period of the spread spectrum codes PN, respectively. Then, the cumulative integration values of the m integrators $321s, 322s, \ldots, 32ms$ are successively supplied to the absolute value arithmetic operation unit 304 as a result of successive changeover by a switch circuit $331s$.

Now, processing action of the spread spectrum code synchronous phase calculation section 300B of the second example is further described with reference to timing charts of FIGS. 11A to 11H. It is to be noted that the action illustrated in FIGS. 11A to 11H is for the case of m=8.

Figure 11:
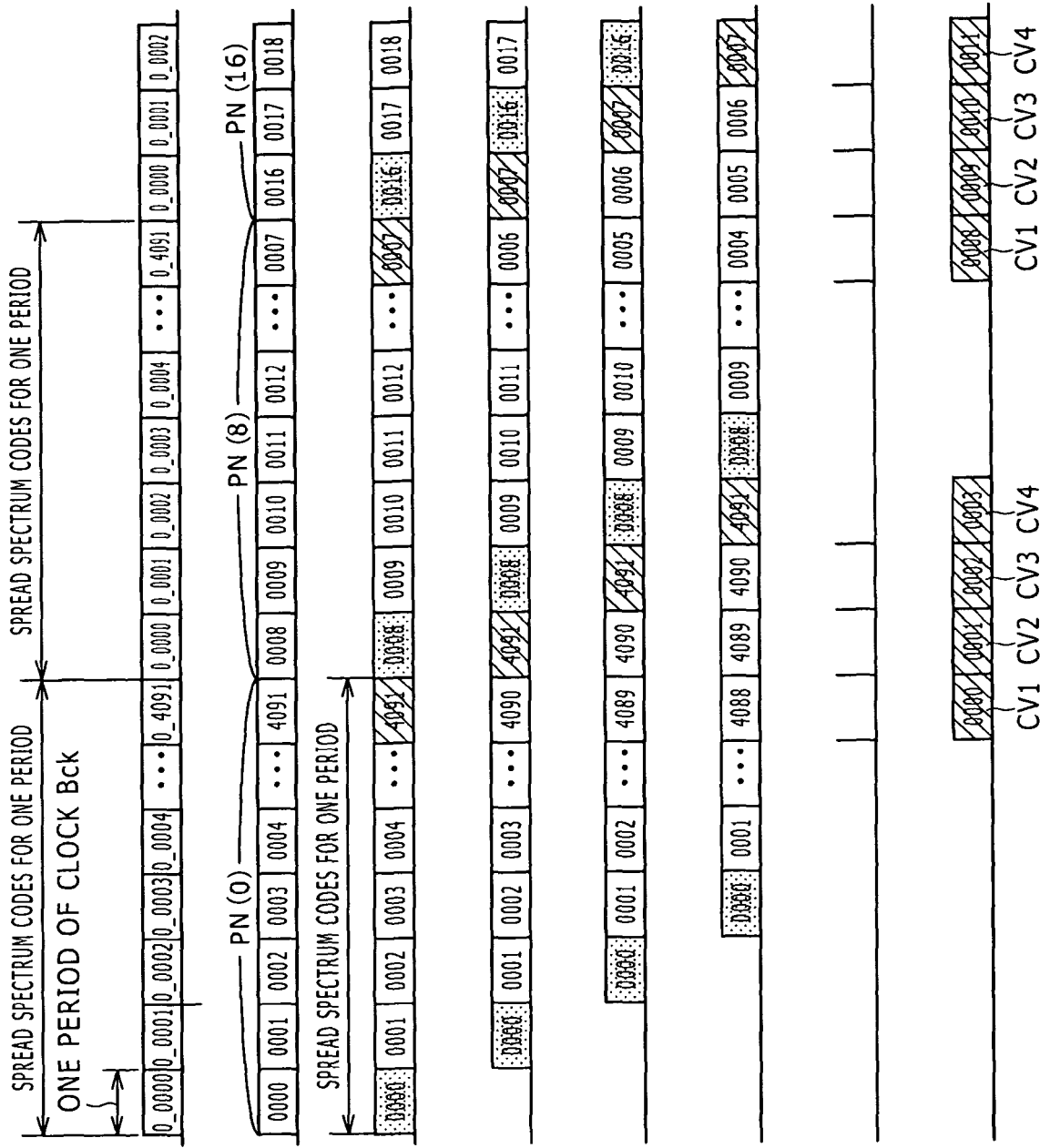
FIGS. 11A to 11H are timing charts illustrating operation of the spread spectrum code synchronism section of FIG. 10.

Addition result data SDr (cosine wave component SDrc and sine wave component SDrs) from the data addition processing section 200 are supplied for every one data sample to the multipliers $311c$ to $31mc$ and the multipliers $311s$ to $31ms$ in synchronism with the clock Bck as seen in FIG. 11A.

Meanwhile, spread spectrum codes PN synchronized with the clock Bck similarly are generated from the spread spectrum code generation unit 301. However, in the case of the present example, the spread spectrum codes PN are generated in such a manner as seen in FIG. 11B In particular, in the present example, the spread spectrum codes PN from the spread spectrum code generation unit 301 have an initial phase which is displaced by an $m \times \frac{1}{4}$ chip after every one period. In other words, where a general expression is used, a spread spectrum code PN from the spread spectrum code generation unit 301 after j periods (j=0, 1, 2, . . . ) is given as a spread spectrum code PN(jm) whose phase is displaced by $jm \times \frac{1}{4}$ chips.

In the example illustrated in FIGS. 11A to 11H, m is m=8, and therefore, spread spectrum codes PN are generated which have an initial phase which is displaced by $8 \times \frac{1}{4}$ chips after every one period like spread spectrum codes PN(0), PN(8), PN(16), . . . .

Then, the spread spectrum code PN is supplied to the shift register 306 using the clock Bck as a transfer clock. Accordingly, from the stages of the shift register 306, outputs SR1, SR2, SR3, SR4 (refer to FIGS. 11C 11D 11E and 11F), . . . , SRm of spread spectrum codes PN whose phase is successively shifted by a one-data sample (¼ chip) are outputted, respectively.

It is to be noted that the output SR1 is the spread spectrum code PN itself from the spread spectrum code generation unit 301, and the phase difference between the output SR1 and the output SRm, that is, a maximum phase difference of a sequence of m spread spectrum codes, corresponds to m−1 chips. Accordingly, in the case of the present example, the spread spectrum code PN from the spread spectrum code generation unit 301 has, from a relationship with m spread spectrum codes from the shift register 306, an initial phase displaced by the (maximum phase difference+1) of the sequence of m spread spectrum codes.

Then, the multipliers $311c$ to $31mc$ and the multipliers $311s$ to $31ms$ simultaneously multiply the addition result data SDrc and SDrs from the data addition processing section 200 by the outputs SR1, SR2, SR3, SR4, . . . , SRm from the shift register 306, respectively. Accordingly, the multipliers $311c$ to $31mc$ and the multipliers $311s$ to $31ms$ simultaneously perform correlation calculation between the addition result data SDrc and SDrs from the data addition processing section 200 and the m spread spectrum codes PN having different phases from one another for one period of the spread spectrum codes PN.

Then, multiplication outputs of the multipliers $311c$ to $31mc$ and the multipliers $311s$ to $31ms$ are supplied to the integrators $321c$ to $32mc$ and the integrators $321s$ to $32ms$, by which they are individually added cumulatively over one period of the spread spectrum codes PN. Consequently, integration outputs SA1c to SAmc and integration outputs SB1s to SBms of the spread spectrum codes PN of the individual phases and the spread spectrum codes of the reception signal are obtained from the integrators $321c$ to $32mc$ and the integrators $321s$ to $32ms$, respectively.

In this instance, however, it is to be noted that, within a period from the integrator $321c$ to the integrator $32mc$ and a period from the integrator $321s$ to the integrator $32ms$, the ending point of the integration for one period of the spread spectrum codes PN is successively displaced by a one-clock interval of the clock Bck.

Then, at a point of time at which the integration arithmetic operation for one period of the spread spectrum codes PN ends, the switch circuit $331c$ is changed over in response to a switching control signal SW3 (refer to FIG. 11G) in synchronism with the clock Bck, and the integration outputs SA1c to SAmc of the integrators $321c$ to $32mc$ are successively supplied to the absolute value arithmetic operation unit 304. Similarly, at the point of time at which the integration arithmetic operation for one period of the spread spectrum codes PN ends, the switch circuit $331s$ is changed over in response to the switching control signal SW3 in synchronism with the clock Bck, and the integration outputs SB1s to SBms of the integrators $321s$ to $32ms$ are successively supplied to the absolute value arithmetic operation unit 304.

Then, the absolute value arithmetic operation unit 304 performs arithmetic operation in accordance with the expression (1) given hereinabove using the m integration outputs SA1c to SAmc and the m integration outputs SB1s to SBms for every one period of the spread spectrum codes PN. Consequently, correlation values CV1 to CVm (refer to FIG. 11H) regarding the m spread spectrum codes PN having different initial phases from one another from the shift register 306 are obtained. In other words, m correlation values CV1 to CVm are obtained for every one period of the spread spectrum codes PN from the absolute value arithmetic operation unit 304. Then, a maximum correlation value is detected and a synchronous phase is decided by the comparison unit 305.

After the spread spectrum codes PN of a certain initial phase for one period are outputted from the spread spectrum code generation unit 301, a spread spectrum code PN having an initial phase displaced by m×¼ chips (refer to FIG. 11A) is outputted from the spread spectrum code generation unit 301 as described hereinabove. This initial phase is displaced by a ¼ chip from that of the output SRm of the last stage of the shift register 306, and therefore, the displacement amount is same as that between the other initial phases of the spread spectrum codes PN.

In this manner, in the second example of the spread spectrum code synchronous phase calculation section 300, correlation values CV1 to CVm between m spread spectrum codes PN having different initial phases from one another and the addition result data SDrc and SDrs of the reception signal are obtained for every one period of spread spectrum codes PN. Then, a maximum correlation value is detected from among the m correlation values CV1 to CVm and a synchronous phase is decided by the comparison unit 305.

For the correlation arithmetic operation for detection of a synchronous phase between the spread spectrum codes PN and the reception signal, it is necessary, in the present example, to vary the initial phase for a spread spectrum code PN to 4,092 different phases in a unit of ¼ chip. However, in the case of the first example of the spread spectrum code synchronous phase calculation section 300, since the initial phase is changed by a ¼ chip for every one period, in order to obtain 4,094 different initial values, displacement by a number of 4,092 times, that is, 4,092 periods are required.

In contrast, in the second example of the spread spectrum code synchronous phase calculation section 300, in order to obtain 4,092 different initial phases, 4,092×1/m periods are required. Consequently, when compared with the first example, the time required is reduced to 1/m, and therefore, the synchronization process can be performed at a higher rate.

[Second Example of a Configuration of the Synchronization Section of the Satellite Signal Receiver Apparatus]

The first example of the synchronization section of the satellite signal receiver apparatus includes a single spread spectrum code synchronous phase calculation section 300 (1 channel) which includes a single spread spectrum code generation unit as shown in FIG. 1. Therefore, in order to perform synchronization of a plurality of reception signals from different artificial satellites, it is necessary to change the spread spectrum code to be generated from the single spread spectrum code generation unit 301 every time to a spread spectrum code of a code system corresponding to the spread spectrum code of an artificial satellite to be received. Consequently, if it is tried to perform synchronization with regard to all of a large number of satellites, then a very long period of time is required.

Figure 12:
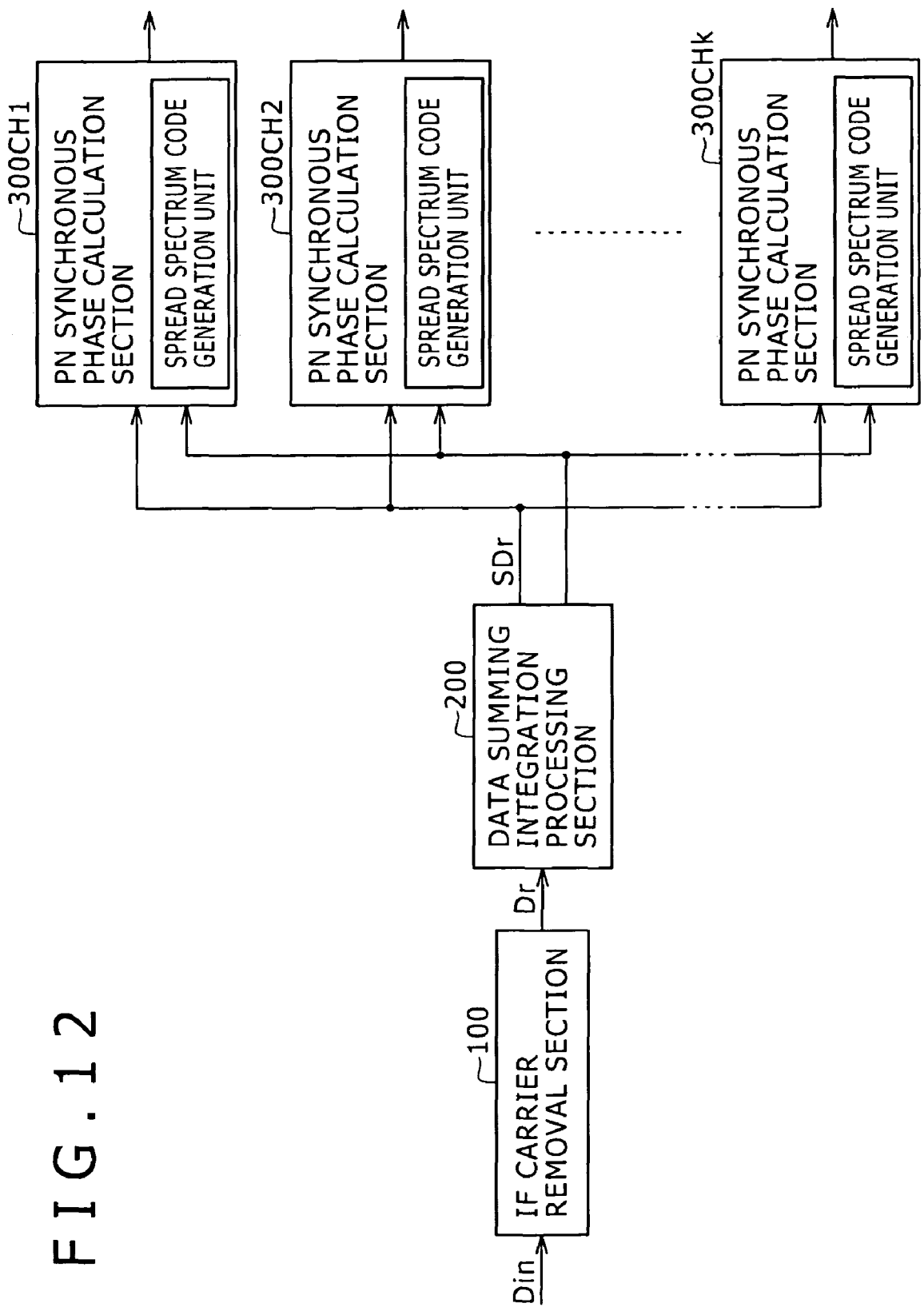
FIG. 12 is a block diagram showing a first example of a configuration of part of the satellite signal receiver apparatus of FIG. 2.

FIG. 12 shows a second example of a configuration of the synchronization section of the satellite signal receiver apparatus which is improved in this regard. Referring to FIG. 12, the synchronization section shown includes a plurality of spread spectrum code synchronous phase calculation sections, each of which includes a spread spectrum code generation unit 301, corresponding to a plurality of channels. In particular, in FIG. 12, the synchronization section includes k spread spectrum code synchronous phase calculation sections 300CH1, 300CH2, . . . , 300CHk (k is an integer equal to or higher than 2) to each of which addition result data SDr (SDrc and SDrs) of the data addition processing section 200 are supplied.

Further, in the present example, the spread spectrum code generation units 301 of the k spread spectrum code synchronous phase calculation sections 300CH1, 300CH2, . . . , 300CHk generate spread spectrum codes of code sequences individually corresponding to spread spectrum codes of the different satellites. Accordingly, in the present embodiment, synchronization regarding reception signals from k different artificial satellites can be executed parallelly and simultaneously. Consequently, also where it is tried to acquire synchronism with regard to reception signals from all artificial satellites, the synchronism can be acquired rapidly.

It is to be noted that each of the k spread spectrum code synchronous phase calculation sections 300CH1, 300CH2, . . . , 300CHk may use the spread spectrum code synchronous phase calculation section 300A of the first example described hereinabove or the spread spectrum code synchronous phase calculation section 300B of the second example.

Further, while, in the embodiment described above, the spread spectrum code generation units 301 of the k spread spectrum code synchronous phase calculation sections 300CH1, 300CH2, . . . , 300CHk are for different code sequences corresponding to spread spectrum codes of reception signals from all of the different satellites, they may otherwise be formed all for the same code sequence.

In this instance, synchronization of a reception signal from one satellite is performed by the k spread spectrum code synchronous phase calculation sections 300CH1, 300CH2, . . . , 300CHk. Then, correlation calculation regarding spread spectrum codes PN for one period is performed by the k spread spectrum code synchronous phase calculation sections 300CH1, 300CH2, . . . , 300CHk. By this, the time required for synchronization of a reception signal from one artificial satellite can be reduced to 1/n.

In this instance, various parallel processing methods can be adopted. For example, according to a method, the spread spectrum code generation units 301 of the k spread spectrum code synchronous phase calculation sections 300CH1, 300CH2, . . . , 300CHk divide one period of spread spectrum codes PN to 1/k, that is, into k divisional intervals, in which individual code sequences are generated. According to another method, a displacement amount by which the initial phase is successively displaced for one period of spread spectrum codes PN is divided into n portions which are taken charge of by the k spread spectrum code synchronous phase calculation sections 300CH1, 300CH2, . . . , 300CHk. Further, where the k spread spectrum code synchronous phase calculation sections 300CH1, 300CH2, . . . , 300CHk are formed using the spread spectrum code synchronous phase calculation section 300B of the second example, the synchronization processing time for a reception signal from one satellite can be further reduced.

[Second Example of a Configuration of the Data Addition Processing Section]

In the first example of the data addition processing section (data addition processing section 200A) described hereinabove, the period for a data addition process and the period for reading out of addition result data to be used for correlation calculation are separated from each other and repeated alternately. However, in a data addition processing section 200B of the second example described below, the data addition process and the data reading out process can be performed simultaneously to achieve higher speed processing.

Figure 13:
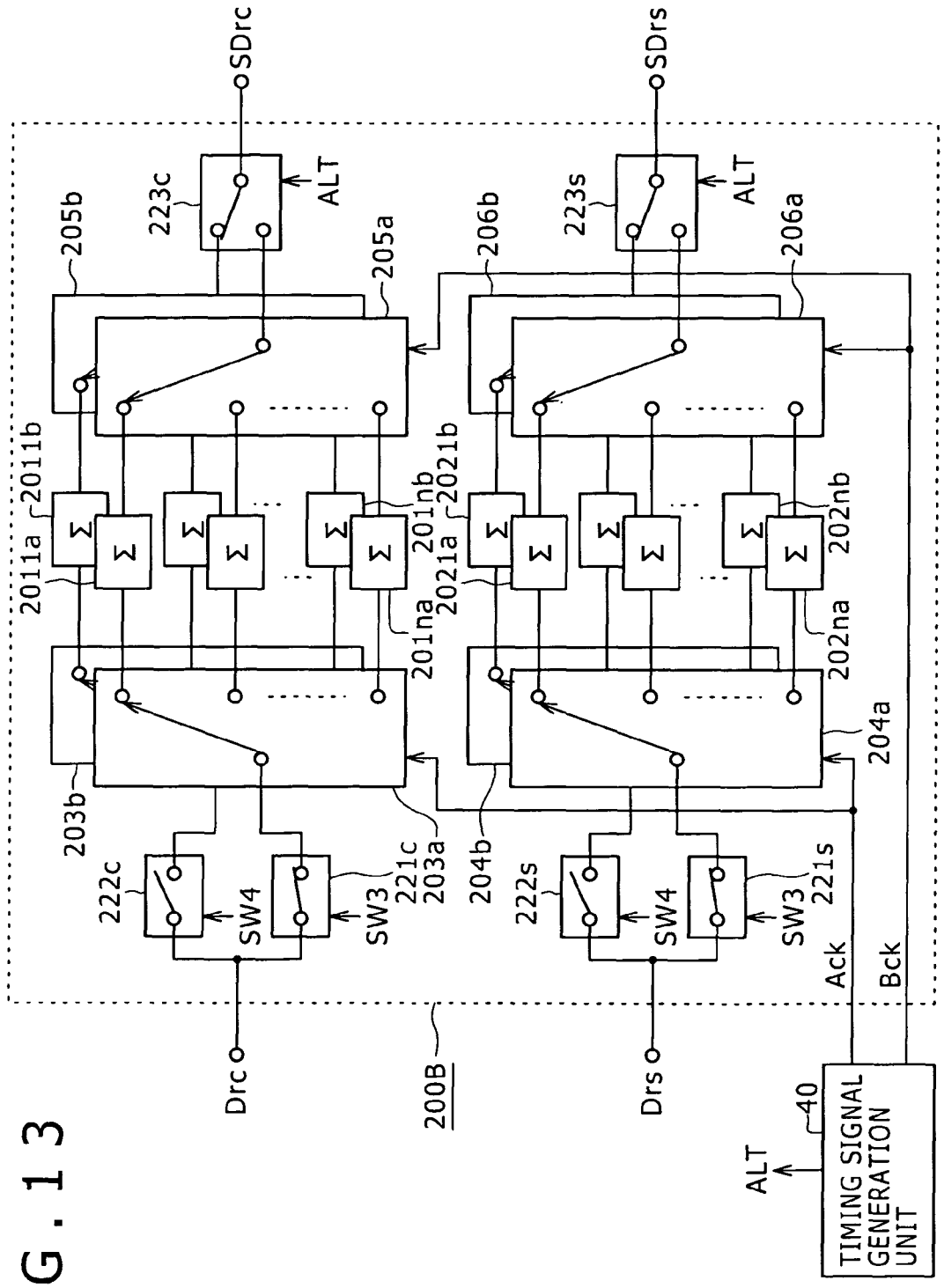
FIG. 13 is a block diagram showing a second example of a configuration of the data addition processing section of FIG. 6.

FIG. 13 shows an example of a configuration of the data addition processing section 200B of the second example. In the data addition processing section 200B shown in FIG. 13, two sets of n summing integrators and switch circuits provided on the input side and the output side of the n summing integrators are provided individually for IF data Drc and Drs from which an IF carrier is removed. The n summing integrators are for one period of spread spectrum codes in the data addition processing section 200A of the first example.

In particular, referring to FIG. 13, for the IF data Drc, an a group summing integration circuit and a b group summing integration circuit are provided. The a group summing integration circuit includes n summing integrators $2011a$, $2012a, \ldots, 201na$ and switch circuits $203a$ and $205a$ provided on the input side and the output side of the summing integrators $2011a, 2012a, \ldots, 201na$, respectively. The b group summing integration circuit includes n summing integrators $2011b, 2012b, \ldots, 201nb$, and switch circuits $203b$ and $205b$ provided on the input side and the output side of the summing integrators $2011b, 2012b, \ldots, 201nb$, respectively.

The IF data Drc is supplied to the switch circuit $203a$ of the a group summing integration circuit and the switch circuit $203b$ of the b group summing integration circuit through gate circuits $221c$ and $222c$, respectively. The gate circuits $221c$ and $222c$ are controlled to be opened or closed in a unit of a time length of an addition interval SUM described hereinabove in accordance with gate control signals SW3 and SW4 from the timing signal generation unit 40, respectively. In the case of the present example, the gate circuit $221c$ and the gate circuit $222c$ are controlled so that intervals within which they are open may not overlap with each other.

Then, in that one of the summing integration circuits to which that one of the gate circuits $221c$ and $222c$ which is in an open state is connected, a summing integration process is performed over a plurality of periods of spread spectrum codes which form an addition interval SUM in a similar manner as in the data addition processing section 200A of the first example described hereinabove with reference to FIG. 3. Then, a result of the addition is accumulated into the n summing integrators of the summing integration circuit.

Then, addition result data of the a group summing integration circuit and addition result data of the b group summing integration circuit are changed over and extracted as output addition result data SDrc by a switch circuit $223c$ and supplied to the spread spectrum code synchronous phase calculation section 300. The switch circuit $223c$ is changed over in response to a switching control signal ALT from the timing signal generation unit 40.

In this instance, the switch circuit $223c$ is controlled to change over so that the summing integration circuit which is performing a summing integration process is not selected. Further, when the summing integration circuit completes the summing integration process, the switch circuit $223c$ is controlled to change over so that the addition result data is read out.

Similarly, for the IF data Drs, an a group summing integration circuit and a b group summing integration circuit are provided. The a group summing integration circuit includes n summing integrators $2021a, 2022a, \ldots, 202na$, and switch circuits $204a$ and $206a$ provided on the input side and the output side of the summing integrators $2021a, 2022a, \ldots, 202na$, respectively. The b group summing integration circuit includes n summing integrators $2021b, 2022b, \ldots, 202nb$, and switch circuits $204b$ and $206b$ provided on the input side and the output side of the summing integrators $2021b, 2022b, \ldots, 202nb$, respectively.

The IF data Drs is supplied to the switch circuit $204a$ of the a group summing integration circuit and the switch circuit $204b$ of the b group summing integration circuit through gate circuits $221s$ and $222s$, respectively. The gate circuits $221s$ and $222s$ are controlled to be opened or closed in a unit of a time length of the addition interval SUM described hereinabove in accordance with gate control signals SW3 and SW4 from the timing signal generation unit 40, respectively. In the case of the present example, the gate circuits $221s$ and $222s$ are controlled so that intervals within which they are open may not overlap with each other.

Then, in the summing integration circuit to which one of the gate circuits $221s$ and $222s$ which is in an open state is connected, a summing integration process is performed over a plurality of periods of spread spectrum codes which form an addition interval SUM in a similar manner as in the data addition processing section 200A of the first example described hereinabove with reference to FIG. 3. Then, a result of the addition is accumulated into the n summing integrators of the summing integration circuit.

Then, addition result data of the a group summing integration circuit and addition result data of the b group summing integration circuit are changed over and extracted as output addition result data SDrs by a switch circuit $223s$ and supplied to the spread spectrum code synchronous phase calculation section 300. The switch circuit $223s$ is changed over in response to a switching control signal ALT from the timing signal generation unit 40.

In this instance, the switch circuit $223s$ is controlled to change over so that the summing integration circuit which is performing a summing integration process is not selected. Further, when the summing integration circuit completes the summing integration process, the switch circuit $223s$ is controlled to change over so that the addition result data is read out.

Since the data addition processing section 200B has such a configuration as described above, while a summing integration process is being performed by one of the a and b group summing integration circuits, reading out of addition result data can be performed by the other summing integration circuit simultaneously. Consequently, synchronization can be performed at a high speed.

A summing integration process in a synchronization process and reading out processing action of the data addition processing section 200B are further described below. In the satellite signal receiver apparatus of the present embodiment, when the power supply is made available or when the circuit is reset while the satellite signal receiver apparatus is operating, the mode in startup from the state mentioned depends upon data which exist in the satellite signal receiver apparatus at this time.

In particular, the satellite signal receiver apparatus starts up in one of three modes described below depending upon whether four different kinds of information including ephemeris information, almanac information, initial position information and time (current time) information exist in the satellite signal receiver apparatus.

Where none of the four kinds of information exists in the satellite signal receiver apparatus, the startup mode is called "Cold start". Where the ephemeris information from among the four kinds of information does not exist, the startup mode is called "Warm start". Where all of the four kinds of information exist, the startup mode is called "Hot start".

It is to be noted that the initial position information is information of an initial position to be used for position measurement calculation and may indicate a rough position. Meanwhile, the time (current time) information is information of the current time grasped by the satellite signal receiver apparatus and preferably is as accurate as possible. However, even if the time (current time) information indicates rough current time, there is no trouble with position measurement calculation.

The synchronization processing action differs among the different startup modes. The synchronization processing action in two cases of the "Cold start" and the "Hot start" is described.

Figure 14:
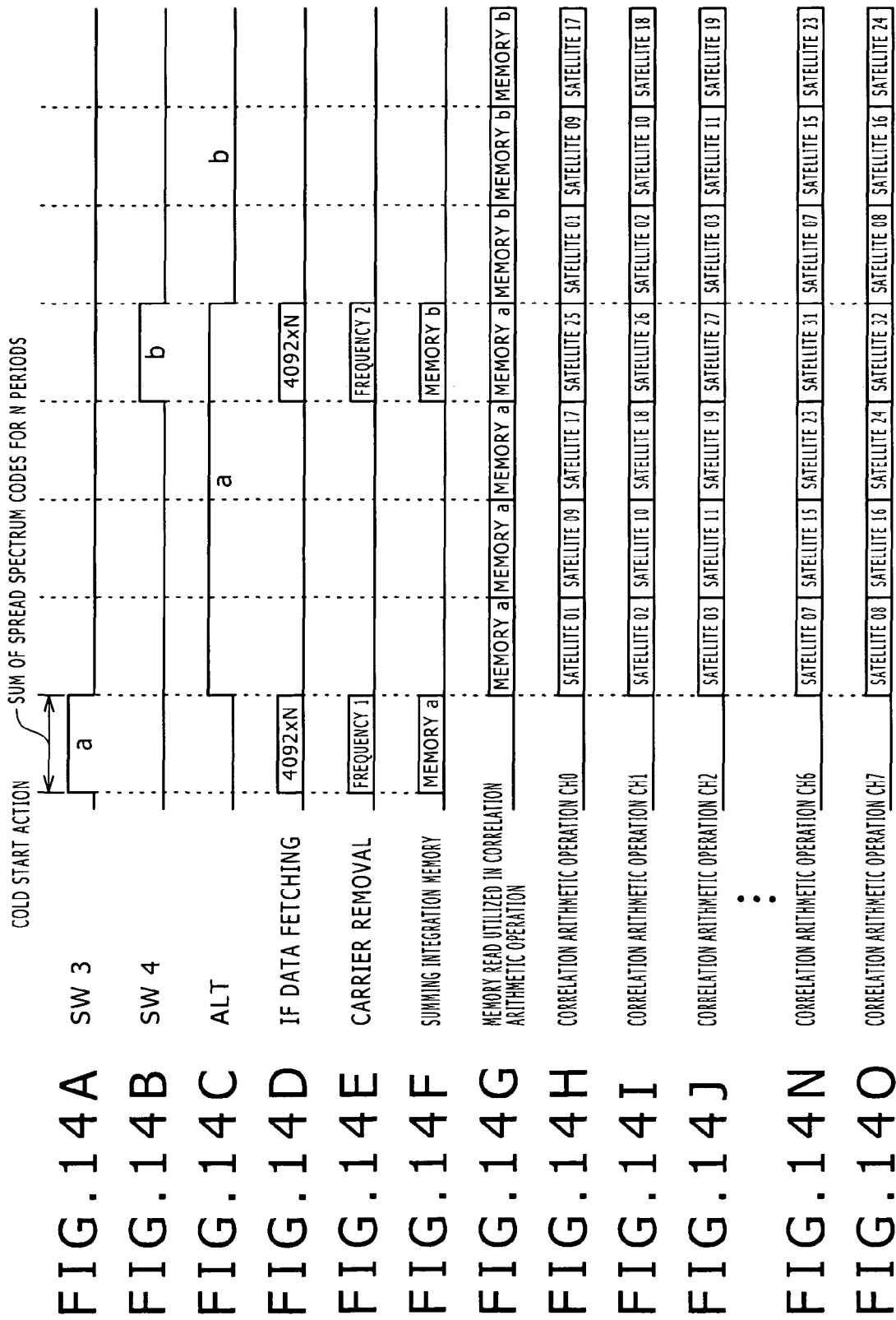
FIGS. 14A to 14J, FIG. 14N and FIG. 14O are timing charts illustrating operation of the data addition processing section of FIG. 13.

FIG. 14 illustrates the synchronization processing action in the "Cold start" mode. It is assumed that, in the example of FIG. 14, a synchronization process is performed for all of reception signals from the 32 artificial satellites, and spread spectrum code synchronous phase calculation sections 300 are provided for 8 channels. In particular, eight spread spectrum code synchronous phase calculation sections 300CH0, 300CH1, 300CH2, . . . , 300CH7 are provided.

Where the summing integration interval SUM described hereinabove is determined as one time unit, the switching control signal ALT for the switch circuits 223c and 223s has such a waveform as seen in FIG. 14C so that the switch circuits 223c and 223s are changed over such that addition result data of the a group summing integration circuit and addition result data of the b group summing integration circuit are selected alternately for every period corresponding to four summing integration periods SUM.

Then, the gate control signals SW3 and SW4 for the gate circuits 221c and 221s and the gate circuits 222c and 222s operate in such a manner as seen in FIGS. 14A and 14B, respectively. In particular, the gate circuits 221c and 221s and the gate circuits 222c and 222s individually exhibit an open state within one summing integration interval SUM from among every 8× summing integration periods SUM. Further, the interval SUM within which the gate circuits 221c and 221s are open and the interval SUM within which the gate circuits 222c and 222s are open are different in phase by an interval corresponding to 4× summing integration periods SUM. Furthermore, the gate control signals SW3 and SW4 are selected so that the gate circuits 221c and 221s and the gate circuits 222c and 222s individually indicate an open state within an interval SUM immediately preceding to an edge timing of the switching control signal ALT.

Then, within one summing integration interval SUM within which the gate circuits 221c and 221s are controlled to an open state with the gate control signal SW3, a signal obtained by multiplication of the IF data Din extracted through the IF carrier removal section 100 by a produced IF carrier frequency signal to remove the IF carrier from the IF data Din is fetched into the data addition processing section 200B (refer to FIG. 14D). At this time, as seen from FIG. 14E, to the produced IF carrier frequency signal, one frequency is set within one addition interval SUM, but within the other addition interval SUM, a frequency determined in response to the processing timing is set.

The IF data Drc and Drs from the IF carrier removal section 100 from which the IF carrier is removed are subject to a summing integration process by the a or b group summing integration circuit within one addition interval SUM after every one interval of four summing integration periods SUM. Then, a result of the summing integration process is accumulated into the memory of the a or b summing integration circuit. It is to be noted that the memory of the a group summing integration circuit is hereafter referred to as "memory a", and the memory of the b group summing integration circuit is hereinafter referred to as "memory b".

Then, the switch circuits 205a and 205b and the switch circuits 206a and 206b are changed over with the switching control signal ALT so that the addition result data obtained by the summing integration within the addition interval SUM are read out four times over an interval of 4× summing integration periods SUM next to the addition interval SUM (refer to FIG. 14G). The thus read out addition result data are supplied in parallel to the eight spread spectrum code synchronous phase calculation sections 300CH0 to 300CH7.

The eight spread spectrum code synchronous phase calculation sections 300CH0 to 300CH7 perform correlation calculation with regard to reception signals individually from satellites different from one another to perform synchronization of reception signals from the totaling 32 satellites as seen from FIGS. 14H, 14I, 14J, . . . , 14N and 14O. Accordingly, in this instance, the spread spectrum code generation unit 301 generate spread spectrum codes PN of spread spectrum code sequences regarding the reception signals from the satellites different from one another after every interval of an addition interval SUM as seen in FIGS. 14H, 14I, 14J, . . . , 14N and 14O.

The processes described above are repetitively performed by alternately reading out addition result data of the a group summing integration circuit and addition result data of the b group summing integration circuit while the summing integration is performed by that summing integration circuit which is not performing reading out.

Figure 15:
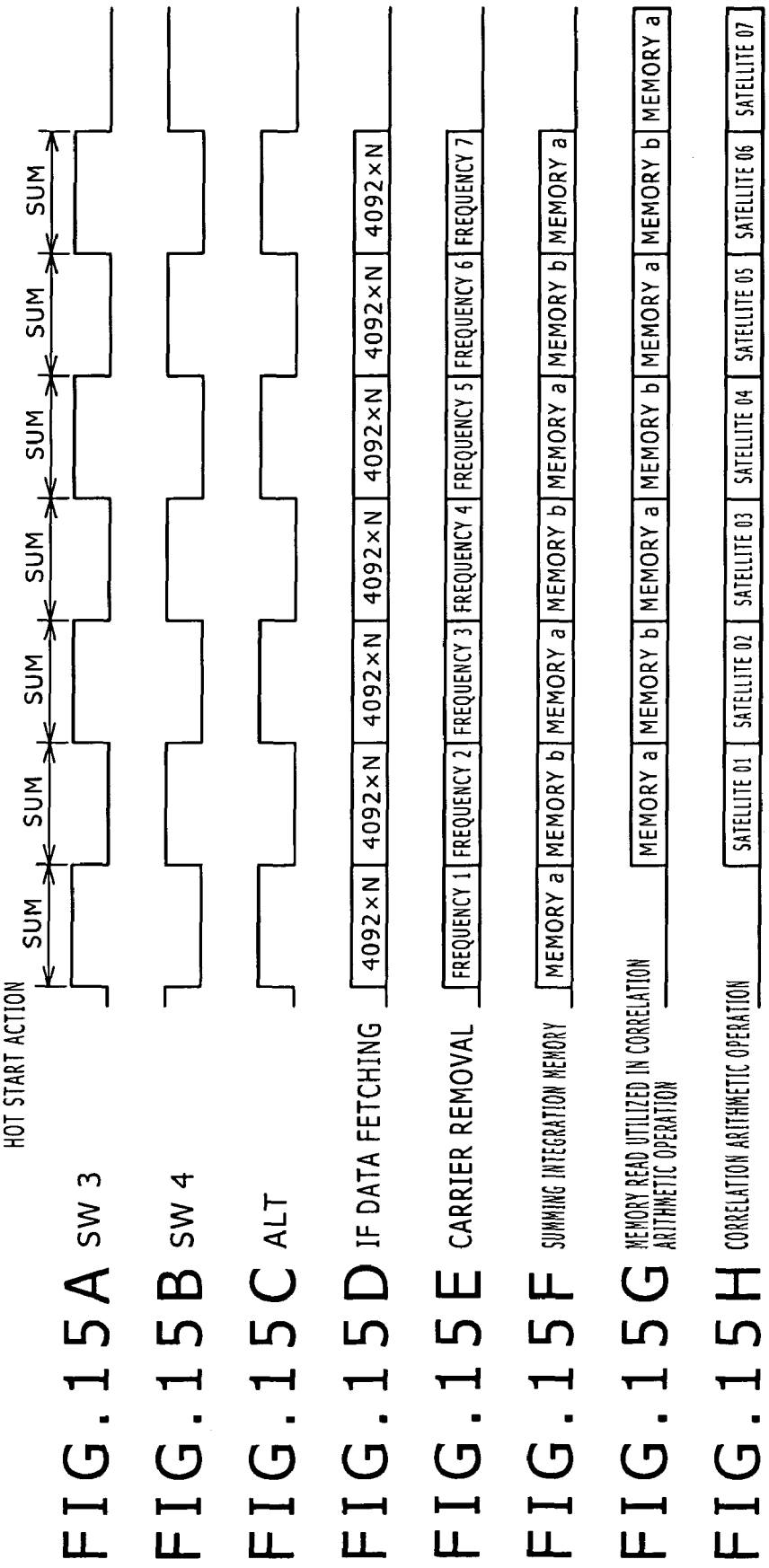
FIGS. 15A to 15H are timing charts illustrating operation of the data addition processing section of FIG. 13.

FIG. 15 illustrates the synchronization processing action in the "Hot start" mode. In the "Hot start" mode, the summing integration process is performed alternately by both of the a and b group summing integration circuits for every one addition interval SUM while addition result data are read out from that summing integration circuit which is not performing the summing integration process thereby to perform correlation calculation, different from those in the "Cold start" mode. Consequently, the summing integration process is normally performed by one of the a and b group summing integration circuits, and also the correlation calculation process is normally performed.

Consequently, in this instance, there is no necessity to provide such a calculation interval CAL as in the case of the data addition processing section 200A separately from an addition interval SUM. Therefore, the processing time can be reduced, and consequently, the synchronization process can be performed at a higher speed.

In the following, the synchronization processing action in the "Hot start" mode of the example of FIGS. 15A to 15H is described.

In particular, the gate control signal SW3 opens or closes the gate circuits 221c and 221s after every addition interval SUM as seen in FIG. 15A, and the gate control signal SW4 has a polarity reverse to that of the gate control signal SW3 as seen in FIG. 15B. Further, the switching control signal ALT for the switch circuits 223c and 223s changes over the a and b group summing integration circuits after every addition interval SUM as seen in FIG. 15C.

Accordingly, as seen from FIG. 15D, the IF data Dr are fetched alternately into the a and b summing integration circuits and undergo a summing integration process individually by the a and b summing integration circuits. Then, results of the summing integration process are individually accumulated into the memories a and b as seen in FIG. 15F. At this time, for the IF data Dr to be fetched for every one addition interval SUM, the IF carrier frequency to be generated from the IF carrier generation unit 101 of the IF carrier removal section 100 is changed for every one addition interval SUM as seen in FIG. 15E.

Then, the addition result data accumulated in the memories a and b of the a and b group summing integration circuits are read out alternately after every one addition interval SUM as seen in FIG. 15G. Then, in the example of FIG. 12, correlation calculation is performed by the plural spread spectrum code synchronous phase calculation sections 300 using the read out addition result data. At this time, in each of the spread spectrum code synchronous phase calculation sections 300, that is, in the spread spectrum code synchronous phase calculation section 300CHj (j=1, 2, 3, . . . ) for each of the different channels, the spread spectrum code from the spread spectrum code generation unit 301 is changed so that the satellite of an object of synchronization is changed after every one addition interval SUM as seen from FIG. 15H.

[Example of an Improved Configuration of the Data Addition Processing Section 200B of the Second Example]

Figure 16:
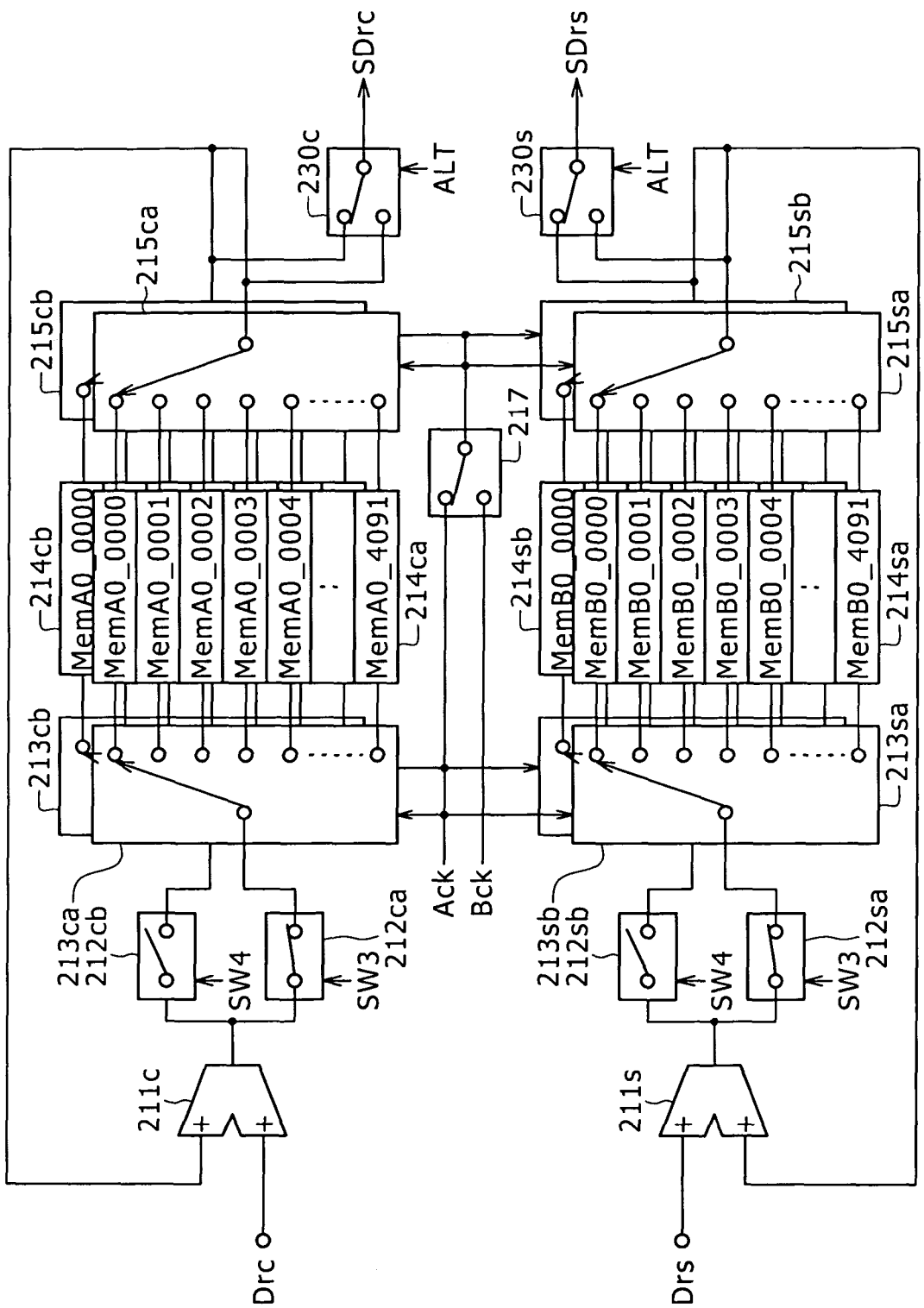
FIG. 16 is a block diagram showing a detailed configuration of the data addition processing section of FIG. 13.

An example of an improved configuration of the data addition processing section 200B of FIG. 13 is shown in FIG. 16. The example of FIG. 16 corresponds to the configuration example of FIG. 6 in the case of the data addition processing section 200A of the first example.

In the example of FIG. 16, the data addition processing section 200B includes two group circuit portions, that is, a and b group circuit portions, each including the memories 214c and 214s, switch circuits 213c and 213s provided on the writing side of the memories 214c and 214s, switch circuits 215c and 215s provided on the reading out side of the memories 214c and 214s and gate circuits 212c and 212s of the configuration example of FIG. 6. It is to be noted that the adders 211c and 211s are provided one by one for the IF data Drc and Drs, respectively.

In FIG. 16, each circuit element of the a group circuit portion is denoted by a corresponding same reference character to which the suffix a is added, and each circuit element of the b group circuit portion is denoted by a corresponding same reference character to which the suffix b is added.

In particular, for the IF data Drc, the a group circuit portion which includes a memory 214ca, a switch circuit 213ca, a switch circuit 215ca and gate circuit 212ca and the b group circuit portion which includes a memory 214cb, a switch circuit 213cb, a switch circuit 215cb and a gate circuit 212cb are provided.

For the IF data Drs, the a group circuit portion which includes a memory 214sa, a switch circuit 213sa, a switch circuit 215sa and a gate circuit 212sa and the b group portion which includes a memory 214sb, a switch circuit 213sb, a switch circuit 215sb and a gate circuit 212sb are provided.

Addition outputs of the adders 211c and 211s are supplied to the a group circuit portion through the a group gate circuits 212ca and 212sa and supplied to the b group circuit portion through the b group gate circuits 212cb and 212sb, respectively.

Further, in the example of FIG. 16, addition result data from the switch circuits 215ca and 215cb are extracted through a switch circuit 230c, which is changed over with the switching control signal ALT, and supplied to the spread spectrum code synchronous phase calculation section 300. Similarly, addition result data from the switch circuits 215sa and 215sb are extracted through a switch circuit 230s, which is changed over with the switching control signal ALT, and supplied to the spread spectrum code synchronous phase calculation section 300.

The spread spectrum code synchronous phase calculation section 300 to which the addition result data of the data addition processing section 200B of the second example are supplied may have the configuration of the spread spectrum code synchronous phase calculation section 300A of the first example or the configuration of the spread spectrum code synchronous phase calculation section 300B of the second example. Or, the spread spectrum code synchronous phase calculation section 300 may have a configuration of a spread spectrum code synchronous phase calculation section 300C of a third example hereinafter described or a configuration of a spread spectrum code synchronous phase calculation section 300D of a fourth example hereinafter described.

In this manner, with the data addition processing section 200B of the second example, since it includes a plurality of summing integrators for production of intermediate data for a reproduction arithmetic process, further reduction in processing time can be anticipated. For example, where two sets of summing integrators for intermediate data are provided, it is possible to cause, while intermediate data is produced by one of the summing integrators, a correlator at a succeeding stage to perform correlation calculation for intermediate data produced already by the other summing integrator to try to detect a correlation point.

Where a plurality of sets of summing integrators are prepared, pipe line processing of intermediate data production and correlation calculation can be achieved, and the entire correlation point detection time is reduced. It is to be noted that the number of groups of summing integrators is not limited to two.

[Example of a Configuration of the Spread Spectrum Code Synchronous Phase Calculation Section 300C of the Third Example; High Sensitivity]

In the foregoing, countermeasures for reducing the processing time are described. Now, a countermeasure for enhancing the sensitivity is described.

A reception signal (GPS signal) from an artificial satellite is very weak when compared with thermal noise, and a sufficient sensitivity may not be obtained with a despread gain from a signal for one period of spread spectrum codes. In this instance, usually correlation arithmetic operation of input data and spread spectrum codes is performed over multiple periods. However, since the GPS signal involves navigation message data of 50 bps (1 bit in 20 msec), the sensitivity cannot be assured even if correlation calculation of data is performed for a long period of time.

For example, where the time length of the addition interval SUM of the data summing integration process by the data addition processing section 200 described hereinabove is set to 20 msec, if the phase of 1 bit of the navigation message data and the phase of the addition interval SUM are different by 1180 degrees from each other, then the phase of the spread spectrum code of the reception signal is sometimes reversed between the front half and the rear half of the addition interval SUM. In this instance, the data summing integration value cancels each other between the front half and the rear half of the addition interval SUM, and consequently, enhancement of the sensitivity cannot be anticipated.

Therefore, in the present third example, the time length of the addition interval SUM of the data summing integration process by the data addition processing section 200 is set to a time length with which the influence of the navigation message data is comparatively little, that is, a time length other than 20 msec which is the time length for one bit described above, for example, 16 msec. Then, correlation arithmetic operation results between the addition result data in the time length and spread spectrum codes PN on the reception side are added in absolute values over a predetermined time interval TM of, for example, several seconds, so that a high sensitivity can be assured.

Figure 17:
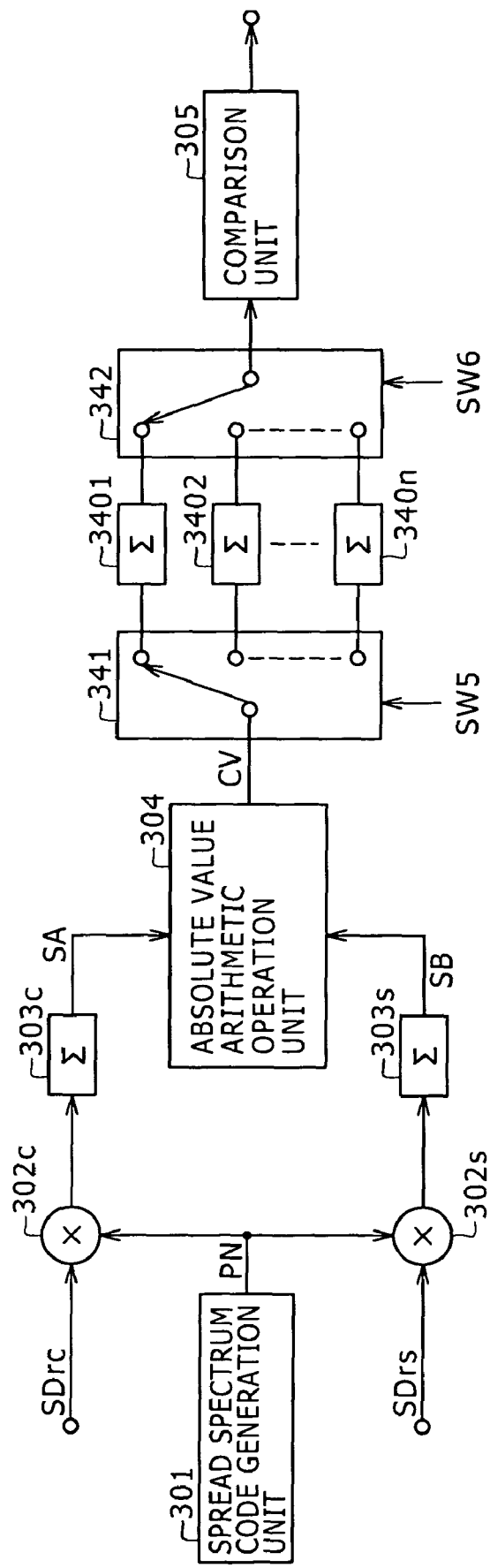
FIG. 17 is a block diagram showing a third example of a configuration of a spread spectrum code synchronism phase calculation section of the synchronization section of FIG. 1.

FIG. 17 shows an example of a configuration in principle of a spread spectrum code synchronous phase calculation section 300C of the third example. The spread spectrum code synchronous phase calculation section 300C of the present third example includes a summing integration circuit for absolute value arithmetic operation results between an absolute value arithmetic operation unit 304 and a comparison unit 305.

Then, the correlation calculation is performed for all initial phases obtained by displacing the initial phase of spread spectrum codes for one period successively by one phase. Therefore, in the present example, absolute value arithmetic operation results which are correlation arithmetic operation results at the initial phases are summing integrated over the predetermined time interval TM, in the present example, over an interval of TM=8 seconds.

To this end, the summing integration circuit includes n summing integrators 3401, 3402, . . . , 340n in order to summing integrate absolute value arithmetic operation results for one period of spread spectrum codes regarding each of the initial phase. In the present example, since the sampling frequency is 4,092 MHz, n=4092 summing integrators are provided.

Absolute value arithmetic operation results CV from the absolute value arithmetic operation unit 304 are changed over, for each of the absolute value arithmetic operation results regarding the spread spectrum codes of the individual initial phases, by a switch circuit 341 which is controlled to change over with a switching control signal SW5 such that they are supplied to the n summing integrators 3401, 3402, . . . , 340n. Each of the summing integrators 3401, 3402, . . . , 340n summing integrates an absolute value arithmetic operation result regarding spread spectrum codes of one initial phase over a predetermined time interval TM (in the present example, TM=8 seconds) and then stores a result of the integration into a respective storage section.

Then, after absolute value arithmetic operation results regarding spread spectrum codes of the individual initial phases are summing integrated over the predetermined time interval TM of the IF data Din by the n summing integrators 3401, 3402, . . . , 340n, they are read out and supplied to the comparison unit 305 through a switch circuit 342 which is changed over with a switching control signal SW6. The switching control signal SW6 is generated at such timings that, after the absolute value arithmetic operation results regarding the spread spectrum codes of the initial values are summing integrated over the predetermined time interval TM by the n summing integrators 3401, 3402, . . . , 340n, they are successively read out.

The comparison unit 305 compares the summing integration results successively read out and inputted from the n summing integrators 3401, 3402, . . . , 340n to perform detection of a maximum correlation value thereby to detect a synchronous phase and a correlation value at the synchronous phase.

The cumulative addition process of the n summing integrators 3401, 3402, . . . , 340n is further described with reference to FIGS. 18A to 18G and 19. It is to be noted that, in the example described below, the data addition processing section 200B of the second example is used as the data addition processing section 200.

Figure 18:
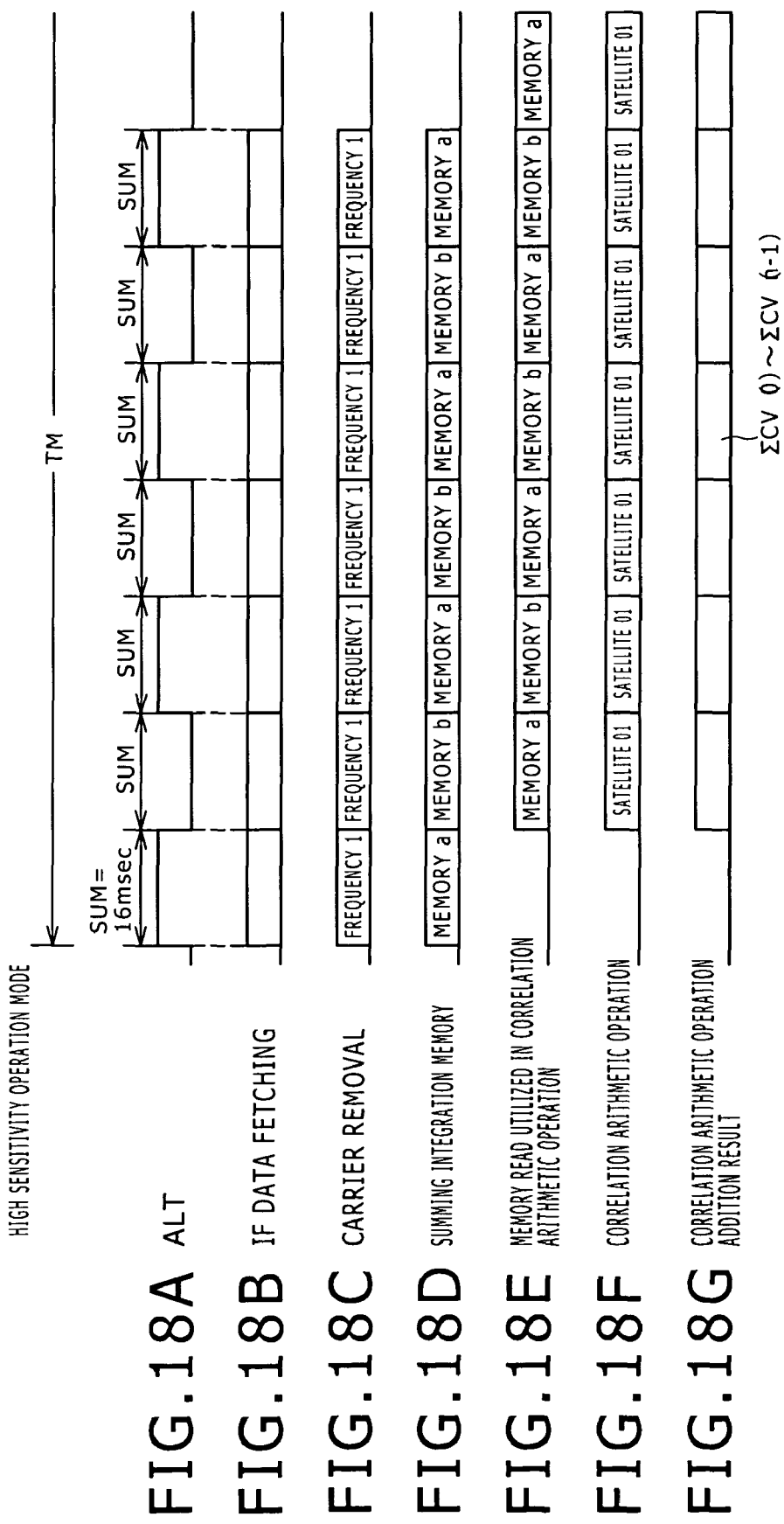
FIGS. 18a to 18g are timing charts illustrating operation of the spread spectrum code synchronism phase calculation section of FIG. 17.

In the present example, as seen in FIG. 18C, IF carrier frequencies removed by the carrier removal section 100 in the data addition processing section 200 are equal among all addition periods SUM (in this example, SUM=16 msec) within an interval of a predetermined time period TM within which absolute value arithmetic operation results are to be summing integrated. It is to be noted that the IF carrier frequency may otherwise be changed successively to a value determined by the control section 30 after every addition interval SUM.

Then, addition result data are accumulated alternately into the memory a of the a group summing integration circuit and the memory b of the b group summing integration circuit after every addition interval SUM as seen in FIG. 18D. Further, the addition result data are read out from the memory of that one of the summing integration circuits with which a summing integration process is not proceeding as seen in FIG. 18E and are supplied to the spread spectrum code synchronous phase calculation section 300C.

The spread spectrum code synchronous phase calculation section 300C performs correlation arithmetic operation of the addition result data from the data addition processing section 200B with spread spectrum codes PN of a spread spectrum code sequence from one artificial satellite within a predetermined time interval TM as seen in FIG. 18F.

Here, where a plurality of spread spectrum code synchronous phase calculation section 300C are provided on the output side of the data addition processing section 200B as described hereinabove with reference to FIG. 12, the spread spectrum code synchronous phase calculation sections 300C should perform correlation arithmetic operation with spread spectrum codes PN of spread spectrum code sequences from artificial satellites different from one another. It is to be noted that the spread spectrum code synchronous phase calculation sections 300C may perform correlation calculation with a spread spectrum code PN of a spread spectrum code sequence of a single common artificial satellite so as to perform parallel processing.

Then, correlation results CV(0) to CV(n−1) of the addition result data within the addition periods SUM with the spread spectrum codes PN are determined by the spread spectrum code synchronous phase calculation section 300C and are cumulatively added into the n summing integrators 3401 to 340n for the individual initial phases of the spread spectrum codes PN over the predetermined time interval TM (refer to ΣCV(0) to ΣCV(n−1) of FIG. 18G).

Then, the comparison unit 305 decides whether or not each of the integrated correlation values ΣCV(0) to ΣCV(n−1) is a maximum correlation value thereby to detect a synchronous phase.

A cumulative addition process of the spread spectrum code synchronous phase calculation section 300C described above is further described with reference to FIG. 19. In the present example, as seen in FIG. 19, within a predetermined time interval TM within which absolute value arithmetic operation results are to be summing integrated, correlation results CV(0) to CV(n−1) regarding all initial phases of spread spectrum codes PN from the spread spectrum code generation unit 301 with results of summing integration where, for example, the addition interval SUM is SUM=16 msec are obtained repetitively from the absolute value arithmetic operation unit 304.

Then, since the switch circuit 341 is changed over every time a correlation result regarding one initial phase is obtained, the correlation results of the same initial phases are supplied to the same one of the summing integrators 3401 to 340n.

Figure 19:
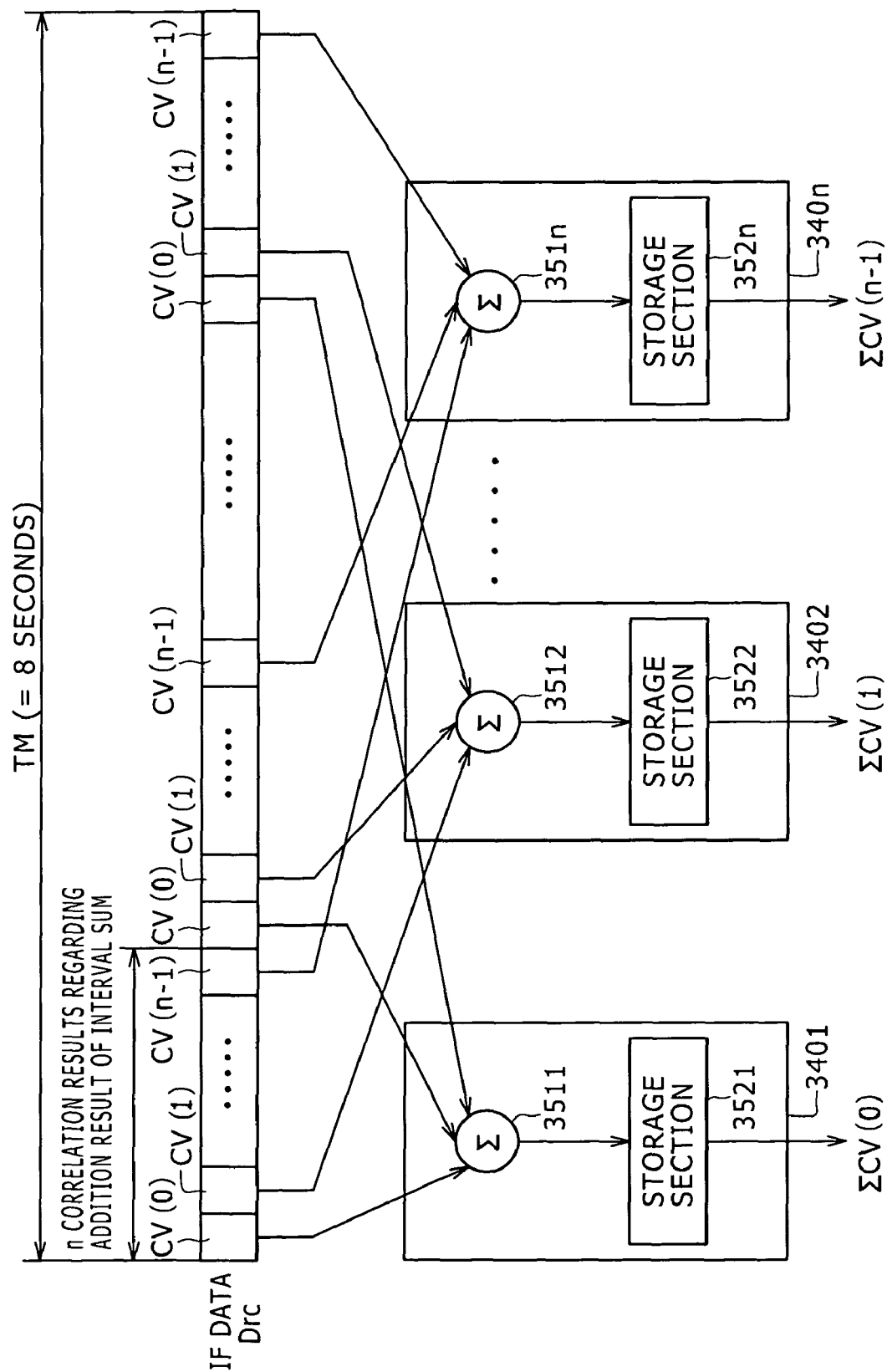
FIG. 19 is a block diagram illustrating operation the spread spectrum code synchronism phase calculation section of FIG. 17.
Figure 20:
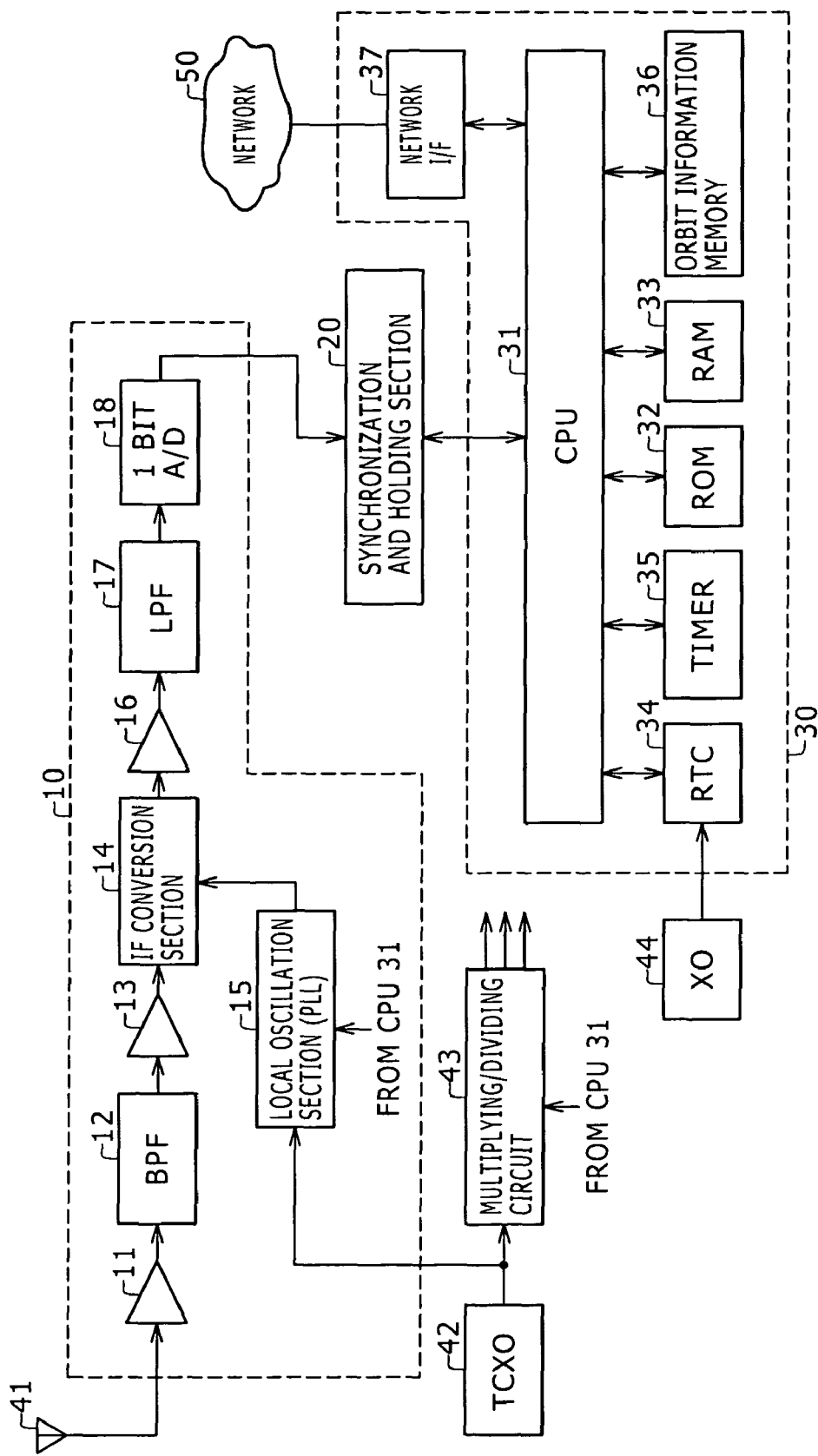
FIG. 20 is a block diagram showing an example of a configuration of a satellite signal receiver apparatus according to a second embodiment of the present invention.

Consequently, as seen in FIG. 19, the correlation results of each same initial phase are cumulatively added into one of the addition sections 3511, 3512, . . . , 351n within the predetermined time interval TM. Then, the cumulative addition results of the addition sections 3511, 3512, . . . , 351n are written to the storage sections 3521, 3522, . . . , 352n, respectively.

In this manner, the cumulative outputs ΣCV(0) to ΣCV(n−1) of the correlation results CV(0) to CV(n−1) regarding all initial phases of the spread spectrum codes PN within the predetermined time interval TM are stored into the storage sections 3521 to 352n of the summing integrators 3401 to 340n, respectively.

Then, the cumulative outputs ΣCV(0) to ΣCV(n−1) are successively read out from the storage sections 3521 to 352n through the switch circuit 342 and supplied to the comparison unit 305 so that a synchronous phase between the spread spectrum codes PN and spread spectrum codes of the reception signal from one satellite is detected.

[Third Example of a Configuration of the Synchronization Section of the Satellite Signal Receiver Apparatus; High Sensitivity]

It is generally known that, where an output of an absolute value arithmetic operation unit 304 is added as in the spread spectrum code synchronous phase calculation section 300C of the third example described above, a square error appears in response to the intensity of a reception signal from a satellite and enhancement of the sensitivity according to the addition time cannot be expected. A satellite signal receiver apparatus according to the third embodiment of the present invention is improved to solve this problem.

In the present example, the satellite signal receiver apparatus includes a network interface (I/F) 37 connected to the CPU 31 of the control section 30 so as to establish a connection to an external network 50 such as the Internet. Therefore, the control section 30 can acquire navigation message data of the GPS satellites and accurate time information from the external network 50.

The control section 30 produces a navigation message data removal signal for removing navigation message data included in a reception signal from a satellite from navigation message data and accurate time information acquired from the external network 50. The control section 30 sends the produced navigation message data removal signal to the synchronization section of the third configuration example. The synchronization section of the third configuration example uses the navigation message data removal signal to execute a process of removing the navigation message data included in the reception signal.

The configuration of the other part of the satellite signal receiver apparatus is similar to that of the satellite signal receiver apparatus of the example of FIG. 2, and overlapping description thereof is omitted herein to avoid redundancy.

Figure 21:
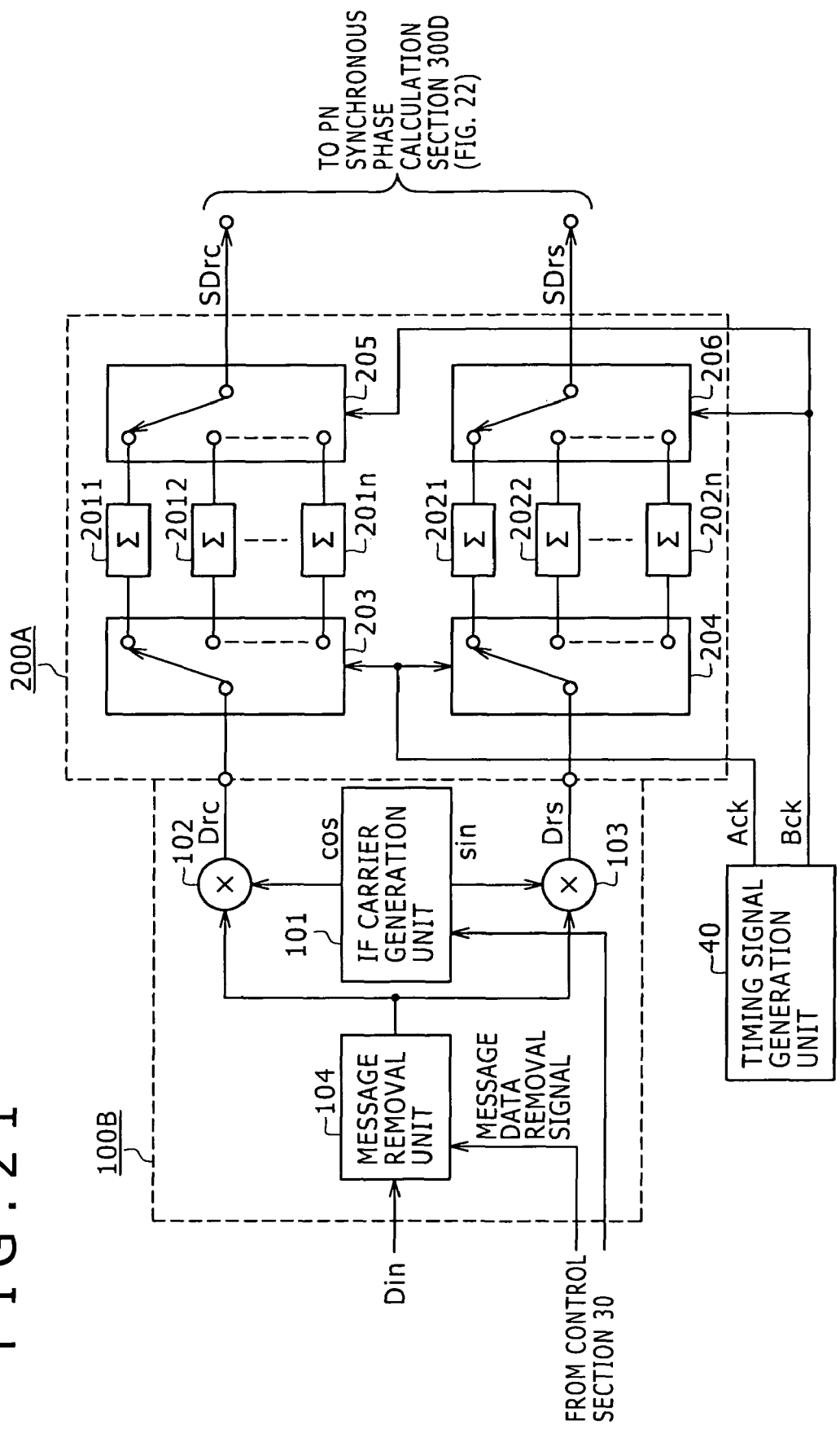
FIG. 21 is a block diagram showing an example of a configuration of an IF carrier removal section and a data addition processing section of a synchronization section according to a second embodiment of the present invention shown in FIG. 20.
Figure 22:
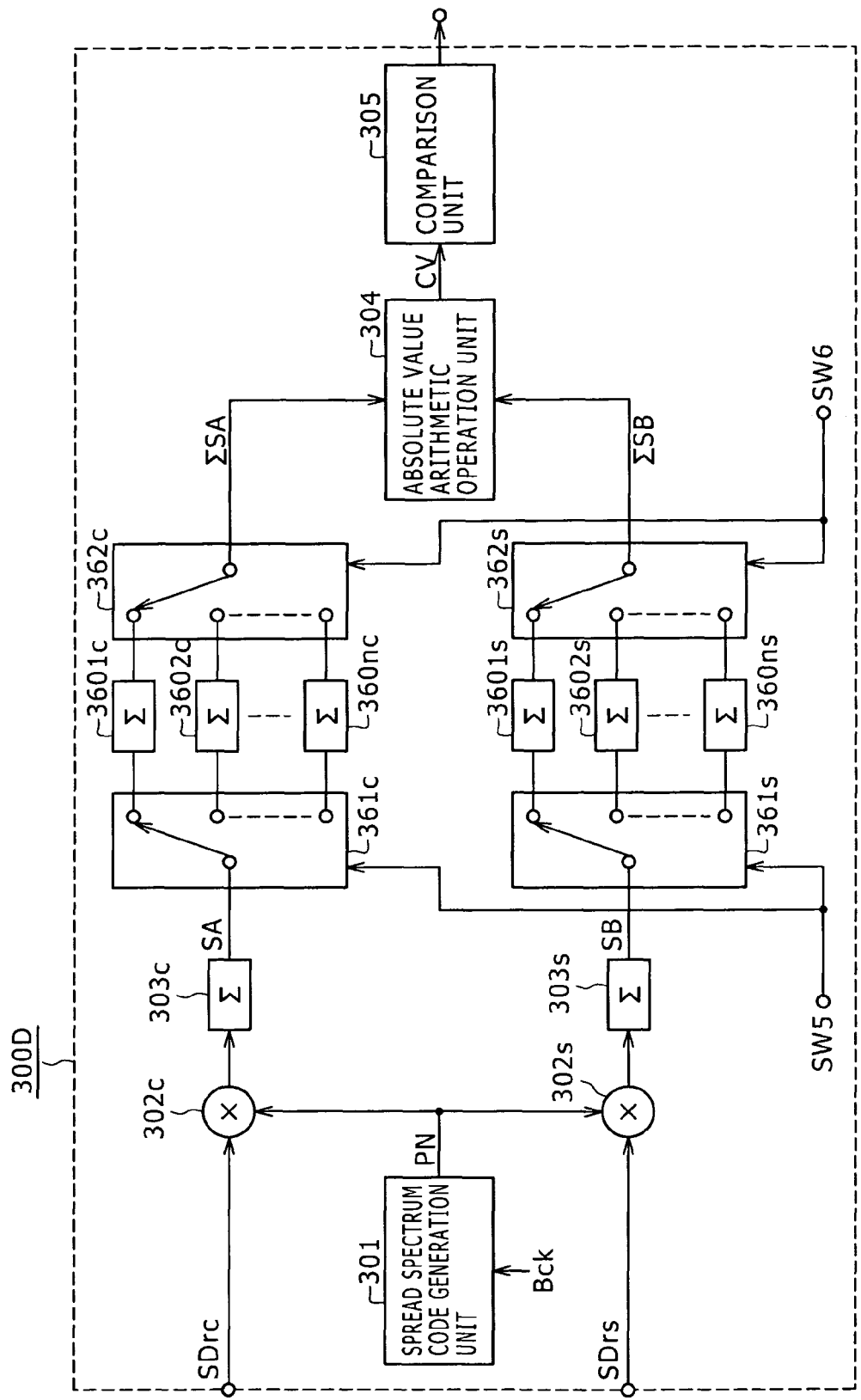
FIG. 22 is a block diagram showing a fourth example of a configuration of the spread spectrum code synchronism phase calculation section shown in FIG. 1.

FIGS. 21 and 22 show a third example of a configuration of the synchronization section. The synchronization section includes an IF carrier removal section 100, a data addition processing section 200 and a spread spectrum code synchronous phase calculation section 300 similarly as in the examples described hereinabove. However, the IF carrier removal section 100 and the spread spectrum code synchronous phase calculation section 300 have a different configuration from those of the examples described hereinabove.

In particular, the IF carrier removal section 100 has such a configuration of an IF carrier removal section 100B of the second example as seen in FIG. 21, and the spread spectrum code synchronous phase calculation section 300 has such a configuration of a spread spectrum code synchronous phase calculation section 300D of a fourth example as shown in FIG. 22. In the example of FIG. 21, the data addition processing section 200 has the configuration of the data addition processing section 200A of the first example described hereinabove. It is to be noted that the data addition processing section 200 may otherwise have the configuration of the data addition processing section 200B of the second example.

Referring to FIG. 21, in the IF carrier removal section 100B of the second example, IF data Din from the frequency conversion section 10 is supplied to IF carrier removing multipliers 102 and 103 through a message removal unit 104.

The message removal unit 104 receives a navigation message data removal signal produced from navigation message data and accurate time information acquired through the external network 50 as described hereinabove from the control section 30. In the example shown, the navigation message data removal signal is navigation message data itself which is adjusted so as to have a phase synchronized as much as possible with the navigation message data included in the IF data Din.

A spread spectrum code of the reception signal from the satellite has an original polarity where the bit of the navigation message data is "0", but has an inversed polarity where the bit of the navigation message data is "1". Accordingly, in a signal obtained by addition over a long period of time, spread spectrum codes cancel each other, and the correlation arithmetic operation value with spread spectrum codes on the reception side does not exhibit a high value, resulting in a low sensitivity.

The message removal unit 104 reverses the polarity of the IF data Din within every interval within which the navigation message data removal signal, which is binary data of "0" or "1", is "1". Consequently, any spread spectrum code of the IF data Din whose polarity is inverted is inverted back so as to have the original polarity. Accordingly, if the IF data Din are summing integrated over an addition interval SUM in a unit of one period of spread spectrum codes, then such cancellation of components of the spread spectrum codes as described above can be prevented.

The IF data Din from which a component of the navigation message data is removed in such a manner as described above is multiplied by a signal of an IF carrier frequency from the IF carrier generation unit 101 by the IF carrier removing multipliers 102 and 103 so that the IF carrier frequency is removed from the IF data Din.

Then, a removal process of a navigation message data component is performed by the IF carrier removal section 100B of the second example in such a manner as described above, and IF data Drc and Drs from which the IF carrier frequency component is removed are supplied to the data addition processing section 200A of the first example, by which such a summing integration process as described above is performed.

Then, addition result data SDrc and SDrs of the data addition processing section 200A of the first example are supplied to the spread spectrum code synchronous phase calculation section 300D of the fourth example shown in FIG. 22.

Referring to FIG. 22, in the spread spectrum code synchronous phase calculation section 300D of the fourth example, the addition result data SDrc and SDrs and a spread spectrum code PN from the spread spectrum code generation unit 301 are multiplied by multipliers 302$c$ and 302$s$ and results of the multiplication are cumulatively added into integrators 303$c$ and 303$s$ over one period of spread spectrum codes PN, respectively. The elements mentioned above of the spread spectrum code synchronous phase calculation section 300D are similar to those of the spread spectrum code synchronous phase calculation section 300A and 300C of the first and third examples.

In the spread spectrum code synchronous phase calculation section 300D of the fourth example, the summing integration circuit, which is provided at the next stage to the absolute value arithmetic operation unit 304 in the spread spectrum code synchronous phase calculation section 300C of the third example, is provided at the preceding stage to the absolute value arithmetic operation unit 304. Therefore, in the spread spectrum code synchronous phase calculation section 300D of the fourth example, a summing integration circuit for a cosine wave component and another summing integration circuit for a sine wave component are provided.

In particular, in order to summing integrate multiplication results SA for one period of spread spectrum codes regarding individual initial phases, the summing integration circuit for a cosine wave component includes n summing integrators 3601c, 3602c, ..., 360nc. Meanwhile, in order to summing integrate multiplication results SB for one period of spread spectrum codes regarding the individual initial phases, the summing integration circuit for a sine wave component includes n summing integrators 3601s, 3602s, ..., 360ns.

Further, switch circuits 361c and 361s are provided which are controlled to change over in accordance with the switching control signal SW5 in response to every addition result regarding spread spectrum codes of one initial phase. Consequently, multiplication results SA and SB from the integrators 303c and 303s are changed over by the switch circuits 361c and 361s and supplied to the n summing integrators 3601c, 3602c, ..., 360nc and 3601s, 3602s, ..., 360ns.

Each of the n summing integrators 3601c, 3602c, ..., 360nc and 3601s, 3602s, ..., 360ns summing integrates the multiplication results SA regarding spread spectrum codes of one of the initial phases over a predetermined time interval TM (in the present example, TM=8 seconds) and stores a result of the integration into a storage section thereof.

Then, after the multiplication results SA and SB regarding spread spectrum codes of the initial phases are summing integrated over the predetermined time interval TM of the IF data Din by the n summing integrators 3601c, 3602c, ..., 360nc and 3601s, 3602s, ..., 360ns, summing integration results ΣSA and ΣSB of the multiplication results SA and SB regarding spread spectrum codes of the initial phases are read out. In particular, the summing integration results ΣSA and ΣSB are read out through switch circuits 362c and 362s, which are changed over with the switching control signal SW6, and supplied to the absolute value arithmetic operation unit 304.

Then, the absolute value arithmetic operation unit 304 performs arithmetic operation of the expression (1) given hereinabove applying the summing integration results ΣSA and ΣSB to the real part and the imaginary part, respectively. The absolute value arithmetic operation unit 304 acquires absolute value arithmetic operation results CV through the arithmetic operation and supplies the absolute value arithmetic operation results CV to the comparison unit 305, by which the phase of the spread spectrum codes PN with which the spread spectrum codes of the reception side are synchronized is detected.

In the spread spectrum code synchronous phase calculation section 300D of the fourth embodiment having such a configuration as described above, summing integration of the multiplication results SA of a cosine wave component and the multiplication results SB of a sine wave component is performed. Consequently, square errors can be reduced and enhancement of the sensitivity can be anticipated when compared with an alternative case wherein absolute value arithmetic operation is performed for the multiplication results SA and the multiplication results SB and results of the arithmetic operation are summing integrated.

At this time, an influence of the navigation message data from the IF data Din is eliminated by the IF carrier removal section 100B of the second example. Consequently, cancellation of correlation values by an influence of the navigation message data is eliminated, and the sensitivity can be enhanced in response to the addition time (predetermined time interval TM).

It is to be noted that, while, in FIG. 21, the message removal unit 104 is provided separately from the IF carrier generation unit 101, the message removal unit 104 can be omitted if the IF carrier frequency signal from the IF carrier generation unit 101 is supplied to the IF carrier removing multipliers 102 and 103 after it is reversed in polarity within an interval within which the bit of the navigation message data removal signal is "1".

[Fifth Example of the Spread Spectrum Code Synchronous Phase Calculation Section]

Figure 23:
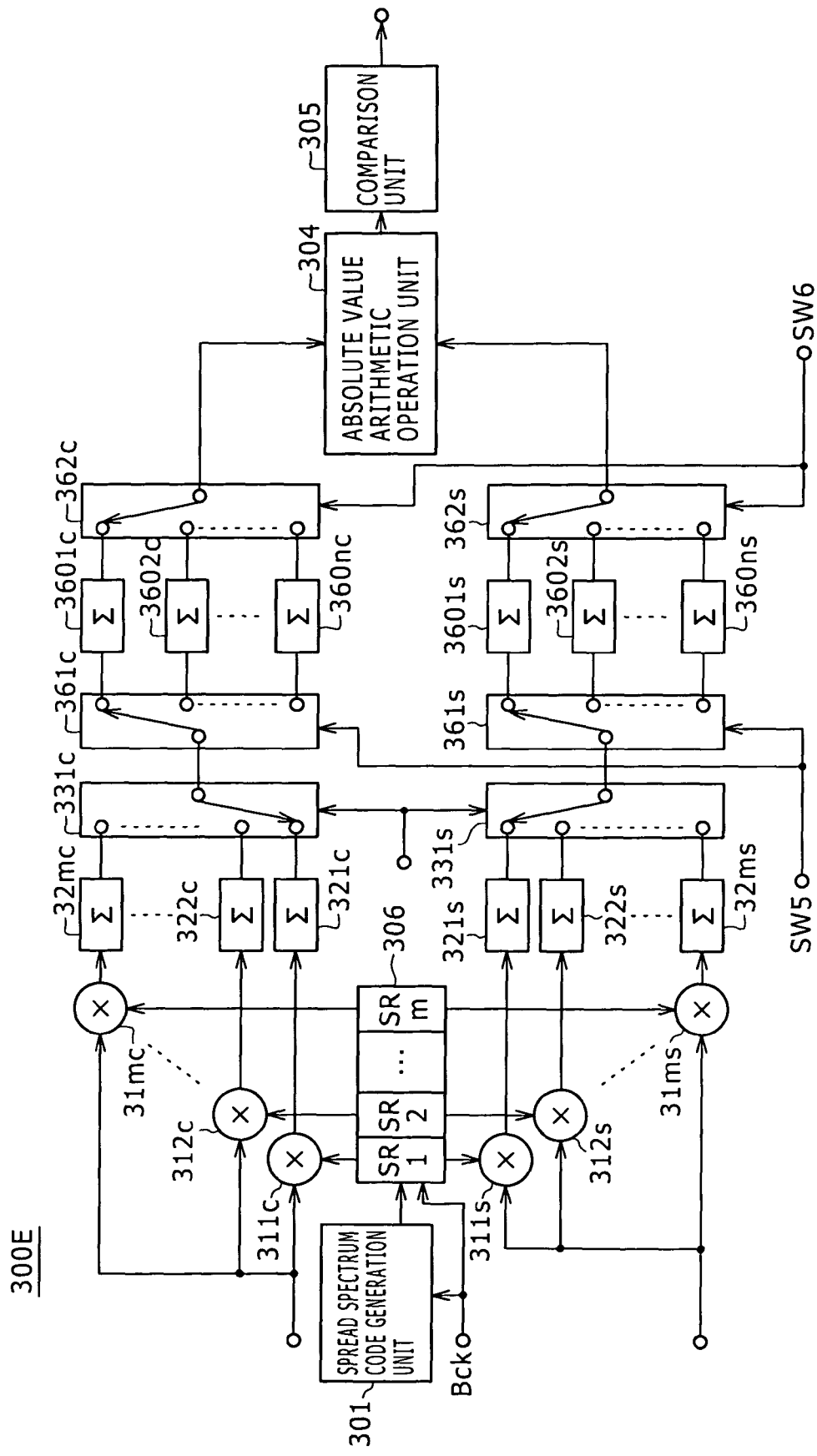
FIG. 23 is a block diagram showing a fifth example of a configuration of the spread spectrum code synchronism phase calculation section shown in FIG. 1.

FIG. 23 shows a fifth example of a configuration of the spread spectrum code synchronous phase calculation section. The spread spectrum code synchronous phase calculation section of the fifth configuration example is denoted by 300E. The spread spectrum code synchronous phase calculation section 300E is an example of improvement of the spread spectrum code synchronous phase calculation section 300D of the fourth example described hereinabove, and has a high sensitivity and achieves reduction in processing time.

Referring to FIG. 23, the spread spectrum code synchronous phase calculation section 300E of the fifth embodiment applies the spread spectrum code generation unit 301 of the spread spectrum code synchronous phase calculation section 300D of the fourth example described hereinabove. The spread spectrum code synchronous phase calculation section 300E further applies the spread spectrum code synchronous phase calculation section 300B of the second example shown in FIG. 10 to a portion for performing correlation calculation of IF data from the data addition processing section 200 with addition result data.

In particular, the spread spectrum code synchronous phase calculation section 300E of the present fifth example includes m (m is an integer equal to or higher than 1) multipliers 311c, 312c, ..., 31mc and m integrators 321c, 322c, ..., 32mc for a cosine wave component. The spread spectrum code synchronous phase calculation section 300E further includes m multipliers 311s, 312s, ..., 31ms and m integrators 321s, 322s, ..., 32ms for a sine wave component.

In particular, output addition result data SDrc of addition result data from the data addition processing section 200 is supplied simultaneously to the n multipliers 311c, 312c, ..., 31mc, and output addition result data SDrs of the addition result data from the data addition processing section 200 is supplied simultaneously to the multipliers 311s, 312s, ..., 31ms.

Meanwhile, a spread spectrum code PN from the spread spectrum code generation unit 301 is supplied to an m-stage shift register 306. Then, an output SR1 of the first stage of the shift register 306 is supplied to the multipliers 311c and 311s; an output SR2 of the second stage to the multipliers 312c and 312s; ..., and an output SRm of the mth stage to the multipliers 31mc and 31ms.

Then, multiplication outputs of the multipliers 311c, 312c, ..., 31mc are supplied to integrators 321c, 322c, ..., 32mc, by which they are cumulatively added over one period of the spread spectrum codes PN, respectively. Then, cumulative integration values of the m integrators 321c, 322c, ..., 32mc are successively changed over by a switch circuit 331c and supplied to a switch circuit 361c.

Similarly, multiplication outputs of the multipliers 311s, 312s, ..., 31ms are supplied to integrators 321s, 322s, ..., 32ms, by which they are cumulatively added over one period of the spread spectrum codes PN, respectively. Then, cumulative integration values of the m integrators 321s, 322s, ..., 32ms are successively changed over by a switch circuit 331s and supplied to a switch circuit 361s.

Those components of the spread spectrum code synchronous phase calculation section 300E which succeed the switch circuits 361c and 361s are similar to those of the spread spectrum code synchronous phase calculation section 300D of the fourth embodiment described hereinabove.

With the spread spectrum code synchronous phase calculation section 300E of the fifth example, a correlation regarding spread spectrum codes PN of m initial phases can be calculated for each addition interval SUM. Therefore, the processing time of the spread spectrum code synchronous phase calculation section 300E can be reduced to 1/m that of the spread spectrum code synchronous phase calculation section 300D of the fourth embodiment.

[Third Example of a Configuration of the Synchronization Section]

Figure 24:
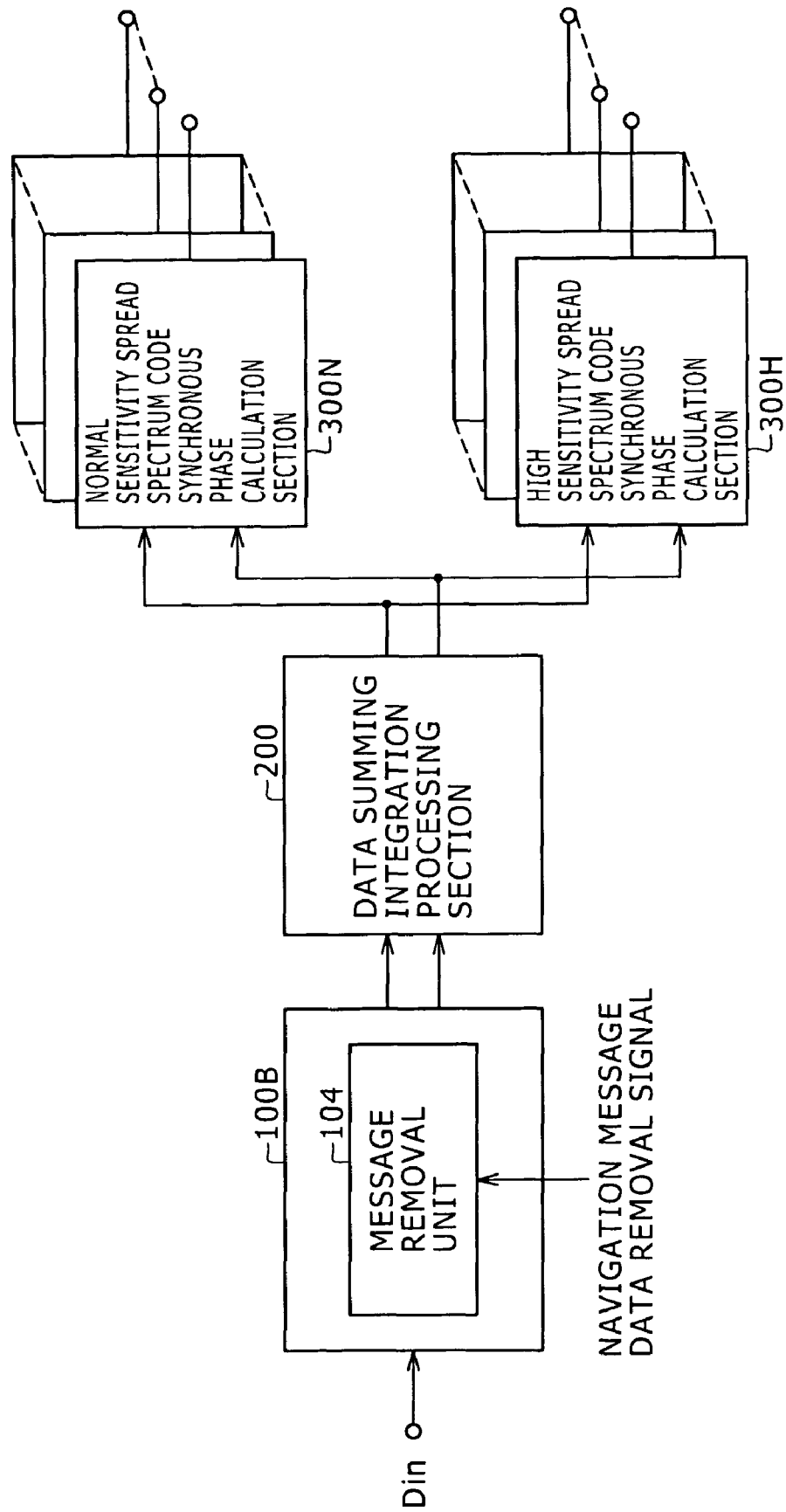
FIG. 24 is a block diagram showing a third example of a configuration of part of the satellite signal receiver apparatus of the present invention.
Figure 25:
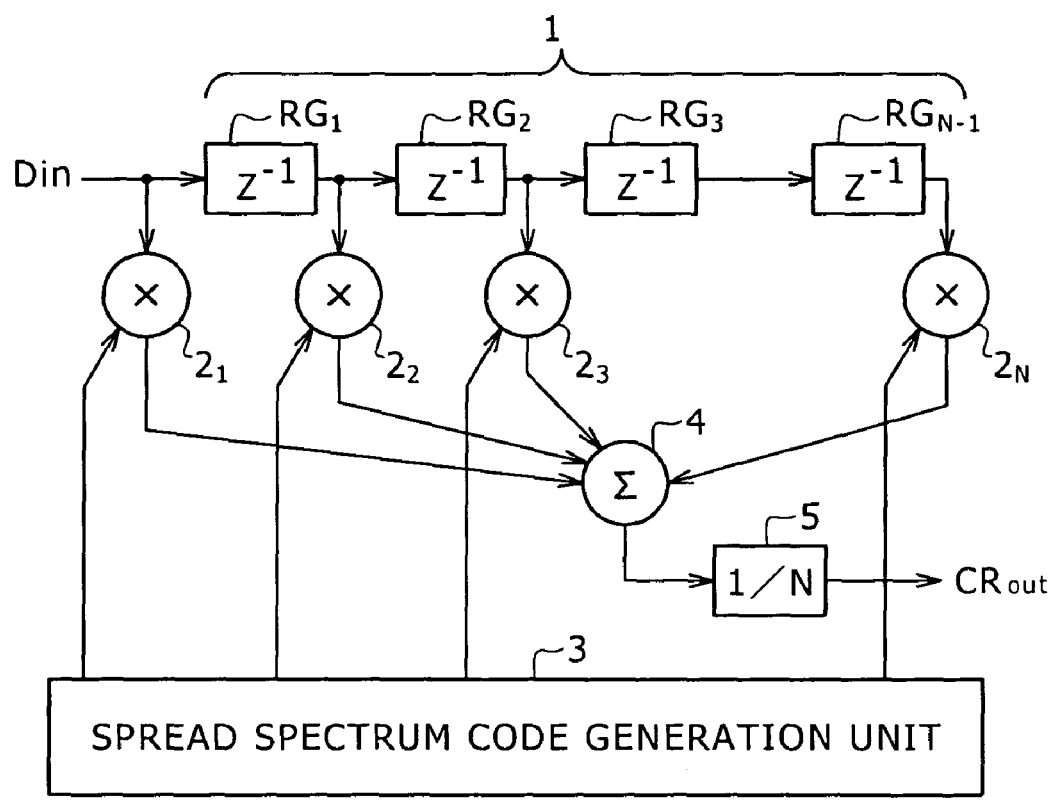
FIG. 25 is a block diagram showing an example of a configuration of a digital matched filter.

A third example of a configuration of the synchronization section is shown in FIG. 24. Referring to FIG. 24, the synchronization section of the present third configuration example includes two spread spectrum code synchronous phase calculation sections, that is, a normal sensitivity spread spectrum code synchronous phase calculation section 300N and a high sensitivity spread spectrum code synchronous phase calculation section 300H. More particularly, as seen in FIG. 24, the synchronization section includes a plural number (equal to the number of channels) of such normal sensitivity spread spectrum code synchronous phase calculation sections 300N and a plurality of high sensitivity spread spectrum code synchronous phase calculation sections 300H, which include a spread spectrum code generation unit.

In the present example, the configuration of the IF carrier removal section 100B of the second example which includes the message removal unit 104 is adopted for an IF carrier removal section. Meanwhile, the configuration of the data addition processing section 200A of the first example or the configuration of the data addition processing section 200B of the second example may be used for the data addition processing section 200.

Further, either one of the spread spectrum code synchronous phase calculation section 300A of the first example and the spread spectrum code synchronous phase calculation section 300B of the second embodiment described hereinabove may be used as each of the normal sensitivity spread spectrum code synchronous phase calculation section 300N (for each one channel).

Further, any of the spread spectrum code synchronous phase calculation section 300C of the third example, the spread spectrum code synchronous phase calculation section 300D of the fourth example and the spread spectrum code synchronous phase calculation section 300E of the fifth example described hereinabove may be used as each of the high sensitivity spread spectrum code synchronous phase calculation sections 300H (for each one channel).

In the satellite signal receiver apparatus to which the third configuration example of the synchronization section is applied, though not shown, a user operation section including, for example, a sensitivity changeover key is provided for the control section 30. If a normal sensitivity is designated in response to an operation of the sensitivity changeover key of the user operation section, then changeover is performed such that only the normal sensitivity spread spectrum code synchronous phase calculation sections 300N are used. However, if a high sensitivity is designated, then changeover is performed such that only the high sensitivity spread spectrum code synchronous phase calculation sections 300H are used.

Or, in place of a switching operation of the user operation section, the control section 30 may refer to a current situation of the satellite signal receiver apparatus such as, for example, a reception electric field intensity of a reception signal and perform automatic changeover so that the normal sensitivity spread spectrum code synchronous phase calculation sections 300N or the high sensitivity spread spectrum code synchronous phase calculation sections 300H are selectively used.

[Other Modification]

In the examples described hereinabove, the synchronization and holding section 20 is configured such that a synchronization section and a synchronism holding section are provided separately from each other. Naturally, however, the synchronization and holding section 20 may be configured otherwise such that, while it has the configuration of the synchronization section, the synchronization section and the synchronism holding section are integrated with each other.

While preferred embodiments of the present invention have been described using specific terms, such description is for illustrative purpose only, and it is to be understood that changes and variations may be made without departing from the spirit or scope of the following claims.

What is claimed is:

1. A satellite signal receiver apparatus for receiving a spread spectrum signal with spread spectrum codes from an artificial satellite and detecting a correlation point between the spread spectrum codes and a spread spectrum code prepared on the receiver side to synchronize with the signal from the artificial satellite, comprising:

a carrier removal section configured to remove a carrier frequency component from the signal received from the artificial satellite;

a data addition section including a memory for storing one period of n samples of the spread spectrum codes and an addition section configured to repetitively add, after every interval of a period of the spread spectrum codes, the received signal after the carrier frequency component is removed therefrom and respective samples of the spread spectrum codes stored in said memory, which samples have the same phase at the interval of a period in successive periods of the spread spectrum codes, and to write the result of the addition back into said memory a number of times corresponding to a plurality of periods of the spread spectrum codes, thereby accumulating summed signals, from which the carrier frequency component is removed, over the plural periods of the spread spectrum codes; and a plurality of synchronous phase calculation sections configured to perform correlation calculation between the signals accumulated over one period in said memory of said data addition section and the spread spectrum code prepared on the receiver side to detect a correlation point between the signal from the artificial satellite and the spread spectrum code on the receiver side, each said synchronous phase calculation section including a spread spectrum code generation unit configured to generate a spread spectrum code on the receiver side.

2. The satellite signal receiver apparatus according to claim 1, wherein the accumulation of data into said memory by said data addition section is performed in accordance with a sampling clock frequency of the signal from which the carrier frequency component is removed, and the synchronous phase calculation sections calculate synchronous phase in accordance with a clock of a frequency higher than the sampling clock frequency.

3. The satellite signal receiver apparatus according to claim 1, wherein each said synchronous phase calculation section comprises:

a spread spectrum code generation unit configured to generate the spread spectrum code on the receiver side;

a spread spectrum code plural phase generation section configured to generate n spread spectrum code sequences having phases successively displaced from the spread spectrum code from said spread spectrum code generation unit by successively displacing an initial phase by an amount corresponding to a (maximum phase difference+1) of the n spread spectrum code sequences for every one period of the spread spectrum codes; and n correlation calculation sections configured to calculate correlations between the n spread spectrum code sequences and the signals for one period of the spread spectrum codes accumulated in said memory;

and wherein the correlation point between the signal from the artificial satellite and the spread spectrum code prepared on the receiver side is detected based on the calculated correlations of said n correlation calculation sections.

4. The satellite signal receiver apparatus according to claim 1, wherein said data addition section includes two memories for one period of the spread spectrum codes to read out, while a summed signal is accumulated in one of said two memories, signals accumulated in the other of said two memories and then to supply the read out signals to said synchronous phase calculation section to detect the correlation point between the signal from the artificial satellite and the spread spectrum code on the receiver side.

5. The satellite signal receiver apparatus according to claim 4, wherein the summed signals are accumulated in said two memories in accordance with a sampling clock frequency of the signal from which the carrier frequency component is removed, and wherein the signals are read out from said two memories and said correlation point is detected in accordance with a clock of a frequency higher than the sampling clock frequency.

6. The satellite signal receiver apparatus according to claim 5, wherein each said synchronous phase calculation section includes:

a spread spectrum code generation unit configured to generate the spread spectrum code on the receiver side;

a spread spectrum code plural phase generation section configured to generate n spread spectrum code sequences having phases successively displaced from the phase of the spread spectrum code from said spread spectrum code generation unit by successively displacing an initial phase of the spread spectrum code from said spread spectrum code generation unit by an amount corresponding to a (maximum phase difference+1) of the n spread spectrum code sequences for every one period; and n correlation calculation sections configured to calculate correlations between the n spread spectrum code sequences and the spread spectrum codes accumulated in any of said two memories for one period, whereby the detection of the correlation point between the signal from the artificial satellite and the spread spectrum code on the receiver side is based on calculation outputs of said n correlation calculation sections.

7. The satellite signal receiver apparatus according to claim 4, wherein each said synchronous phase calculation section comprises:

a spread spectrum code generation unit configured to generate the spread spectrum code a spread spectrum code plural phase generation section configured to generate n spread spectrum code sequences having phases successively displaced from the phase of the spread spectrum code from said spread spectrum code generation unit by successively displacing an initial phase of the spread spectrum code from said spread spectrum code generation unit by an amount corresponding to a (maximum phase difference+1) of the n spread spectrum code sequences for every one period; and n correlation calculation sections configured to calculate correlations between the n spread spectrum code sequences and the spread spectrum codes accumulated in any of said two memories for one period, whereby the detection of the correlation point between the signal from the artificial satellite and the spread spectrum code on the receiver side is based on calculation outputs of said n correlation calculation sections.

8. The satellite signal receiver apparatus according to claim 1, wherein each said synchronous phase calculation section includes:

a correlation calculation section configured to calculate a correlation between the spread spectrum code from said spread spectrum code generation unit and one period of the spread spectrum codes accumulated in said memory for the plural periods;

a correlation result addition section configured to add the calculation result of said correlation calculation section after plural calculations; and a detection section configured to detect a correlation point between the signal from the artificial satellite and the spread spectrum code on the receiver side based on the result from said correlation result addition section.

9. The satellite signal receiver apparatus according to claim 8, wherein said data addition section includes two memories for one period of the spread spectrum codes to read out, while a summed signal is accumulated in one of said two memories, signals accumulated in the other of said two memories and then to supply the read out signals to said synchronous phase calculation sections to detect the correlation point between the signal from the artificial satellite and the spread spectrum code on the receiver side.

10. The satellite signal receiver apparatus according to claim 9, wherein the summed signals are accumulated in said two memories in accordance with a sampling clock frequency of the signal from which the carrier frequency component is removed, and wherein the signals are read out from said two memories and said correlation point is detected in accordance with a clock of a frequency higher than the sampling clock frequency.

11. The satellite signal receiver apparatus according to claim 1, wherein each said synchronous phase calculation section includes:

a spread spectrum code plural phase generation section configured to generate n spread spectrum code sequences having phases successively displaced from the phase of the spread spectrum code from said spread spectrum code generation unit by successively displacing an initial phase of the spread spectrum code from said spread spectrum code generation unit by an amount corresponding to a (maximum phase difference+1) of the n spread spectrum code sequences for every one period;

n correlation calculation sections configured to calculate correlations between the n spread spectrum code sequences and the spread spectrum codes accumulated in said memory for plural periods;

a number of correlation result addition sections equal to the number of the spread spectrum codes to be added for one period, said correlation result addition sections being configured to individually add the calculation results of said n correlation calculation sections a plural number of times; and a detection section configured to detect a correlation point between the signal from the artificial satellite and the spread spectrum code on the receiver side from a number of the addition of said correlation result addition sections equal to the number of the spread spectrum codes for one period of the spread spectrum codes.

12. The satellite signal receiver apparatus according to claim 11, wherein said data addition section includes two memories for one period of the spread spectrum codes to read out, while a summed signal is accumulated in one of said two memories, signals accumulated in the other of said two memories and then to supply the read out signals to said synchronous phase calculation sections to detect the correlation point between the signal from the artificial satellite and the spread spectrum code on the receiver side.

13. The satellite signal receiver apparatus according to claim 9, wherein the summed signals are accumulated in said two memories in accordance with a sampling clock frequency of the signal from which the carrier frequency component is removed, and wherein the signals are read out from said two memories and said correlation point is detected in accordance with a clock of a frequency higher than the sampling clock frequency.

14. The satellite signal receiver apparatus according to claim 1, further comprising a sign reversing section configured to reverse the sign of the signal from the artificial satellite in response to navigation data, and to supply the sign-reversed signal to said data addition section.

* * * * *